United States Patent
Li et al.

(10) Patent No.: US 8,917,444 B2
(45) Date of Patent: Dec. 23, 2014

(54) CHIP-BASED FREQUENCY COMB GENERATOR WITH MICROWAVE REPETITION RATE

(75) Inventors: Jiang Li, Pasadena, CA (US); Hansuek Lee, Pasadena, CA (US); Tong Chen, Pasadena, CA (US); Kerry Vahala, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 194 days.

(21) Appl. No.: 13/525,189

(22) Filed: Jun. 15, 2012

(65) Prior Publication Data
US 2012/0320448 A1    Dec. 20, 2012

Related U.S. Application Data

(60) Provisional application No. 61/498,444, filed on Jun. 17, 2011.

(51) Int. Cl.
*G02F 2/02*    (2006.01)
*G02F 1/225*   (2006.01)

(52) U.S. Cl.
CPC ........ *G02F 1/2257* (2013.01); *G02F 2201/063* (2013.01); *G02F 2201/17* (2013.01); *G02F 2201/58* (2013.01); *G02F 2202/09* (2013.01); *G02F 2202/105* (2013.01); *G02F 2203/15* (2013.01); *G02F 2203/56* (2013.01); *G02F 2203/69* (2013.01)
USPC ................. 359/332; 385/28; 385/30

(58) Field of Classification Search
USPC .................. 359/326–332; 385/27, 28, 30, 50
See application file for complete search history.

(56) References Cited

U.S. PATENT DOCUMENTS

| | | | |
|---|---|---|---|
| 4,461,672 A | 7/1984 | Musser | |
| 4,938,841 A | 7/1990 | Shahar et al. | |
| 5,872,022 A | 2/1999 | Motoda et al. | |
| 6,044,192 A | 3/2000 | Grant et al. | |
| 6,895,133 B1 | 5/2005 | Calkins et al. | |
| 7,590,326 B2 | 9/2009 | Fincato et al. | |
| 8,045,834 B2 | 10/2011 | Painter et al. | |
| 8,094,987 B2 * | 1/2012 | Martin Armani | 385/129 |
| 8,377,320 B2 | 2/2013 | Wang et al. | |
| 8,818,146 B2 * | 8/2014 | Vahala et al. | 385/14 |
| 2005/0169331 A1 | 8/2005 | Vahala et al. | |
| 2007/0230856 A1 | 10/2007 | Yamazaki | |

OTHER PUBLICATIONS

Adar, R., et al., Less than 1 dB Per Meter Propagation Loss of Silica Waveguides Measured Using a Ring Resonator, J. Lightwave Tech. 1994, 12: 1369-1372.
Aoki, T., et al., Observation of strong coupling between one atom and a monolithic microresonator, Nature 2006, 443: 671-674.
Argawi, G., Mode-partition noise and intensity correlation in a two-mode semiconductor laser, Phys. Rev. A 1988, 37: 2488-2434.

(Continued)

*Primary Examiner* — Daniel Petkovsek
(74) *Attorney, Agent, or Firm* — Steinfl & Bruno LLP

(57) ABSTRACT

A frequency comb generator fabricated on a chip with elimination of a disadvantageous reflow process, includes an ultra-high Q disk resonator having a waveguide that is a part of a wedge structure fabricated from a silicon dioxide layer of the chip. The disk resonator allows generation of a frequency comb with a mode spacing as low as 2.6 GHz and up to 220 GHz. A surface-loss-limited behavior of the disk resonator decouples a strong dependence of pumping threshold on repetition rate.

6 Claims, 18 Drawing Sheets

(56) References Cited

OTHER PUBLICATIONS

Armani, D.K., et al., Ultra-high-Q toroid microcavity on a chip, Nature 2003, 421: 925-928.

Barwicz, T., et al., Three-Dimensional Analysis of Scattering Losses Due to Sidewall Roughness in Microphotonic Waveguides, J. Lightwave Tech. 2005, 23: 2719-2732.

Bauters, J., et al. Ultra-low-loss high-aspect-ratio $Si_3N_4$ waveguides, Optics Express 2011, 19: 3163-3164.

Braje, D., et al., Brillouin-Enhanced Hyperparametric Generation of an Optical Frequency Comb in a Monolithic Highly Nonlinear Fiber Cavity Pumped by a cw Laser, Phys. Rev. Letters 2009, PRL 102: 193902-1-193902-4.

Cai, M., et al., Observation of Critical Coupling in a Fiber Taper to a Silica-Microsphere Whispering-Gallery Mode System, Phys. Rev. Letters 2000, 85: 74-77.

Carmon, T., et al., Dynamical thermal behavior and thermal self-stability of microcavities, Optics Express 2004, 12: 4742-4750.

Ciminelli, C., et al., Three-dimensional modeling of scattering loss in InGaAsP/InP and silica-on-silicon bent waveguides, J. Europ. Opt. Society 2009, 4: 09015-1-09015-6.

Ciminelli, C., Photonic technologies for angular velocity sensing, Adv. Opt. & Photo. 2010, 2: 370-404.

Del'Haye, P., et al., Optical frequency comb generation from a monolithic microresonator, Nature 2007, 450: 1214-1218.

Del'Haye, P., et al., Full Stabilization of a Microresonator-Based Optical Frequency Comb, Phys. Rev. Letters 2008, PRL 101: 053903-1-053903-4.

Del'Haye, P., et al., Frequency comb assisted diode laser spectroscopy for measurement of microcavity dispersion, Nature Photonics 2009, 3: 529-533.

Del'Haye, P., et al., Octave Spanning Tunable Frequency Comb from a Microresontaor, Phys. Rev. Letters 2011, PRL 107: 063901-1-063901-4.

Ferdous, F., et al., Spectral line-by-line pulse shaping of on-chip microresonator frequency combs, Nature Photonics 2011, 5: 770-776.

Fortier, T.M., et al., Generation of ultrastable microwaves via optical frequency division, Nature Photonics 2011, 5: 425-429.

Foster, M., et al., Silicon-based monolithic optical frequency comb source, Optics Express 2011, 19: 14233-14239.

Gorodetsky, M., et al., Fundamental thermal fluctuations in microspheres, J. Opt. Soc. Am. B 2004, 21: 697-705.

Grudinin, I., et al., Ultrahigh optical Q factors of crystalline resonators in the linear regime, Phys. Rev. Letters A 2006, 74: 063806-1-063806-9.

Grudinin, I., et al., On the fundamental limits of Q factor of crystalline dielectric resonators, Optics Express 2007, 15: 3390-3395.

Grudinin, I., et al., Generation of optical frequency combs with a $CaF_2$ resonator, Optics Letters 2009, 34: 878-880.

Grudinin, I., et al., Brillouin Lasing with a $CaF_2$ Whispering Gallery Mode Resonator, Phys. Rev. Letters 2009, PRL 102: 043902-1-043902-4.

Hansch, T.W., et al., Laser Frequency Stabilization by Polarization Spectroscopy of a Reflecting Reference Cavity, Optics Comm. 1980, 35: 441-444.

Ip, E., et al., Coherent detection in optical fiber systems, Optics Express 2008, 16: 753-821.

Illchenko, V.S., et al., Optical Resonators with Whispering-Gallery Modes—Part II: Applications, IEEE J. Selected Topics in Quna. Elec. 2006, 12: 15-32.

Johnson, A., et al., Chip-based frequency combs with sub-100 GHz repetition, Optics Letters 2012, 37: 875-877.

Karlsson, C., et al., All-fiber multifunction continuous-wave coherent laser radar at 1.55 μm for range, speed, vibration, and wind measurements, Applied Optics 2000, 39: 3716-31726.

Kasai, K., et al., 256-QAM (64 Gb/s) Coherent Optical Transmission Over 160 km With an Optical Bandwidth of 5.4 GHz, IEEE Phon. Tech. Letters 2010, 22: 185-187.

Kippenberg, T.J., et al., Kerr-Nonlinearity Optical Parametric Oscillation in an Ultrahigh-$Q$ Toroid Microcavity, Phys. Rev. Letters 2004, 93: 083904-1-083904-4.

Kippenberg, T.J., et al., Demonstration of an erbium-doped microdisk laser on a silicon chip, Phys. Rev. A 2006, 74: 051802(R)-1-051802(R).

Kippenberg, T.J, et al., Cavity Opto-Mechanics, Optics Express 2007, 15: 17172-17205.

Kippenberg, T.J, et al., Microresonator-Based Optical Frequency Combs, Science 2011, 332: 555-559.

Kippenberg, T.J, et al., Cavity Optomechanics: Back-Action at Mesoscale, Science 2008, 321: 1172-1176.

Levy, J., et al., CMOS-compatible multiple-wavelength oscillator for on-chip optical interconnects, Nature Photonics 2009, 4: 37-40.

Lu., T., et al., High sensitivity nanoparticle detection using optical microcavities, PNAS 2011, 108: 5976-5979.

Lee, H., et al., Ultra-high-Q wedge-resonator on a silicon chip, arXiv: 1112.2196v1 2011, pp. 1-5.

Matsko, A., et al., Optical Resonators with Whispering Gallery-Gallery Modes—Part I: Basics, IEEE J. Selected Topics in Quna. Elec. 2006, 12: 3-14.

Matsko, A., et al., Whispering-gallery-mode resonators as frequency references. I. Fundamental limitations, J. Opt. Soc. Am. B 2007, 24: 1324-1335.

Okawachi, Y., et al., Tunable All-Optical Delays via Brillouin Slow Light in an Optical Fiber, Phys. Rev. Letters 2005, PRL 94: 153902-1-153902-4.

Okawachi, Y., et al., Octave-spanning frequency comb generation in a silicon nitride chip, Optics Letters 2011, 36: 3398-3400.

Okai, M., et a., Strained multiquantum-well corrugation-pitch-modulated distributed feedback laser with ultranarrow (3.6 kHz) spectral linewidth, Elec. Letters 1993, 29: 1696-+.

Pant, R., et al., Cavity enhanced stimulated Briollouin scattering in an optical chip for multiorder Stokes generation, Optics Letters 2011, 36: 3687-3689.

Payne, S., et al., Spectral and temporal characterization of a fused-quartz-microresonator optical frequency comb, Phys. Rev. A 2011, 84: 053833-1-053833-7.

Payne, S., et al., A theoretical analysis of scattering loss from planar optical waveguides, Opt. and Quan. Elec. 1994, 26: 977-986.

Quinlan, F., et al., A 12.5 GHz-spaced optical frequency comb spanning >400 nm for near-infrared astronomical spectrograph calibration, Rev. Sci. Instr. 2010, 81: 063105-1-063105-9.

Rafac, R.J., et al., Sub-dekahertz Ultraviolet Spectroscopy of [199]Hg+, Phys. Rev. Letters 2000, 85: 2462-2465.

Razzari, L., et al., CMOS-compatible integrated optical hyper-parametric oscillator, Nat. Phon. 2009, 4: 41-45.

Savchenkov, A., et al., Low Threshold Optical Oscillations in a Whispering Gallery Mode $CaF_2$ Resonator, Phys. Rev. Letters 2004, PRL 93: 243905-1-243905-4.

Savchenkov, A., et al., Whispering-gallery-mode resonators as frequency references. II. Stabilization, J. Opt. Soc. Am. B 2007, 24: 2988-2997.

Savchenkov, A., et al., Optical resonators with ten million finesse, Optics Express 2007, 15: 6768-6773.

Savory, S., et al., Laser Linewidth Requirements for Optical DQPSK Systems, IEEE Photo. Tech. Letters 2004, 16: 930-932.

Schawlow, A.L., et al., Infrared and Optical Masers, Phys. Rev. 1958, 112: 1940-1949.

Schliesser, A., et al., Resolved-sideband cooling of a micromechanical oscillator, Nature Physics 2008, 4: 415-419.

Shi, J.W., et al., High-Speed, High-Responsivity, and High-Power Performance of Near-Ballistic Uni-Traveling-Carrier Photodiode at 1.55 μm Wavelength, IEEE Photo. Tech. Letters 2005, 17: 1929-1931.

Smith, S.P., et al., Narrow-linewidth stimulated Brillouin fiber laser and applications, Optics Letters 1991, 16: 393-395.

Spillane, S.M., et al., Ultralow-threshold Raman laser using a spherical dielectric microcavity, Nature 2002, 415: 621-623.

Spillane, S.M., et al., Ideality in a Fiber-Taper-Coupled Microresonator System for Application to Cavity Quantum Electrodynamics, Phys. Rev. Letters 2003, 91: 043902-1-043902-4.

(56) References Cited

OTHER PUBLICATIONS

Tien, M.C., et al., Ultra-high quality factor planar Si3N4 ring resonators on Si substrates, Optics Express 2011, 19: 13551-13556.
Tomes, M., et al., Photonic Micro-Electromechanical Systems Vibrating at X-band (11-GHz) Rates, Phys. Rev. Letters 2009, PRL 102: 113601-1-113601-4.
Yang, L., et al., A 4-Hz Fundamental Linewidth on-chip Microlaser, CLEO 2007, pp. 1-2.
Udem, Th., et al., Optical frequency metrology, Nature 2002, 416: 233-237.
Vahala, K., et al., Semiclassical Theory of Noise in Semiconductor Lasers—Part I, IEEE J. Quan. Elec. 1983, QE-19: 1096-1101.
Vahala, K., Optical microcavities, Nature 2003, 424: 839-846.
Veroony, D.W., et al., High-$Q$ measurements of fused-silica microspheres in the near infrared, Optics Express 1998, 23: 247-249.
Vollmer, F., et al., Whispering-gallery-mode biosensing: label-free detection down to single molecules, Nature Methods 2008, 5: 591-596.
Young, B.C., et al., Visible Lasers with Subhertz Linewidths, Phys. Rev. Letters 1999, 82: 3799-3802.
Zhu, Z., et al., Stored Light in an Optical Fiber via Stimulated Brillouin Scattering, Science 2007, 318: 1748-1750.
Zhu, Z., et al., Broadband SBS Slow Light in an Optical Fiber, J. Lightwave Tech. 2007, 25: 201-206.
Tkach, RW, et al., Spontaneous Brillouin Scattering for Single-Mode Optical-Fibre Characterisation, Elec. Letters 1986, 22: 1011-1013.
Li, J., et al., Chip-based Brillouin lasers as spectral purifiers for photonic systems, arXiv:1201.4212 2011, pp. 1-5.
Li, J., et al., Highly Coherent, Microcavity Brillouin Laser on Silicon, FIO/LS Tech. Digest 2011, pp. 1-2.
Anetsberger, G., et al., Ultralow-dissipation optomechanical resonators on a chip, Nature Photonics 2008, 2: 627-633.
Lu, T., et al., Frequency Noise of a Microchip Raman Laser, CLEO 2009, pp. 1-2.
Savchenkov, A., et al., Tunable Optical Frequency Comb with a Crystalline Whispering Gallery Mode Resonator, Phys. Rev. Letters 2008, PRL 101: 093902-1-093902-4.
Kominato, Extremely Low-loss (0.3 dB/m) and Long Silica-Based Waveguides with Large Width and Clothoid Curve Connection, ECOC Proceedings 2004, 2: pp. 1-2.
Li, J., et al., Characterization of a high coherence, Brillouin microcavity laser on silicon, Optics Express 2012, 20: pp. 1-11.
Li, J., et al., Low-Pump-Power, Low-Phase-Noise, and Microwave to Millimeter-Wave Repetition Rate Operation in Microcombs, Physical Review Letters 2012, 109: 233901-1-233901-5.
Lee, H., et al., Chemically etched ultrahigh-Q wedge-resonator on a silicon chip, Nature Photonics 2012, 6: 369-373.
1—Notice of Allowance mailed on Jun. 16, 2014 for U.S. Appl. No. 13/494,707, filed Jun. 12, 2012 in the name of Kerry Vahala et al.
2—Kippenberg, T.J. et al. "Fabrication and coupling to planar high-Q silica disk microcavities," Applied Physics Letters, vol. 83(4), pp. 797-799, 2003.
3—Xu, D.X. et al. "Archimedean spiral cavity ring resonators in silicon as ultra-compact optical comb filters" Optics Express, vol. 18, No. 3, pp. 1937-1945, 2010.
4—Restriction Requirement mailed on Dec. 29, 2010 for U.S. Appl. No. 12/436,935, filed May 7, 2009 in the name of Andrea Martin Armani et al.
5—Non-Final Office Action mailed on May 3, 2011 for U.S. Appl. No. 12/436,935, filed May 7, 2009 in the name of Andrea Martin Armani et al.
6—Notice of Allowance mailed on Jul. 26, 2011 for U.S. Appl. No. 12/436,935, filed May 7, 2009 in the name of Andrea Martin Armani et al.
7—Armani, D.K., et al. "Ultra-high-Q toroid microcavity on a chip." Nature, vol. 421, pp. 925-928, 2003.
8—Gorodetsky, M.L., et al. "Ultimate Q of optical microsphere resonators." Optics Letters, vol. 21, No. 7, pp. 453-455, 1996.
9—Vernooy, D.W., et al. "High-Q measurements of fused-silica microspheres in the near infrared." Optics Letters, vol. 23, No. 4, pp. 247-249, 1998.
10—Kippenberg, T.J., et al. "Demonstration of an erbium-doped microdisk laser on a silicon chip." Physical Review A, vol. 74, Art. 051802, 2006.
11—Lytollis J., et al. "Infra-red optical communication systems." Infrared Physics, vol. 8, Issue 1, pp. 123-129; 1968.
12—Vahala, K.J. Optical microcavities, Nature, vol. 424, No. 6950, pp. 839-846, 2003.
13—Hossein-Zadeh, M. and Vahala, K.J. "Importance of Intrinsic-Q in Microring-Based Optical Filters and Dispersion-Compensation Devices." Photonics Technology Letters, vol. 19, Issue 14, pp. 1045-1047, 2007.
14—Grudinin, I.S., et al. "Ultrahigh optical Q factors of crystalline resonators in the linear regime." Physical Review A, vol. 74, Art. 063806, 2006.
15—Kohtoku, M., et al. "New Waveguide Fabrication Techniques for Next-generation PLCs." NTT Technical Review, vol. 3, No. 7, pp. 37-41, 2005.
16—Syms, R.R.A. et al., "Reflow and Burial of Channel Waveguides Formed in Sol-Gel Glass on Si Substrates." IEEE Photonics Technology Letters, vol. 5, No. 9, 1077-1079, Sep. 1993.
17—Poulsen, M.R. et al., "Advances in silica-based integrated optics." Opt. Eng., vol. 42, 2821-2834, Oct. 2003.
18—Non-Final Office Action mailed on Sep. 1, 2011 for U.S. Appl. No. 13/033,391, filed Feb. 23, 2011 in the name of Andrea Martin Armani et al.
19—Non-Final Office Action mailed on Nov. 25, 2011 for U.S. Appl. No. 13/033,391, filed Feb. 23, 2011 in the name of Andrea Martin Armani et al.
20—Geng, J. et al. "Narrow Linewidth Fiber Laser for 100-km Optical Frequency Domain Reflectometry," IEEE Photon. Technol, Lett. 17, 1827-1929, 2005.
21—Li, J. et al. "Chip-Based Frequency Combs with Microwave Repetition Rate." 6 pgs, Mar. 28, 2012.
22—Lee, H. et al. "Ultra-Low-Loss Optical Delay Line on a Silicon Chip," 7 pgs. Mar. 20, 2012.
23—Restriction Requirement mailed on Aug. 15, 2014 for U.S. Appl. No. 13/525,147, filed Jun. 15, 2012 in the name of Jiang Li et al.

* cited by examiner

CHIP-BASED FREQUENCY COMB GENERATOR WITH MICROWAVE REPETITION RATE

CROSS REFERENCE TO RELATED APPLICATIONS

The present application claims priority to U.S. Provisional Patent Application No. 61/498,444 entitled "Chip-Base Frequency Comb with Microwave Repetition Rate" filed on Jun. 17, 2011 which is incorporated herein by reference in its entirety. The present application may also be related to: i) U.S. Provisional Patent Application No. 61/498,442 entitled "Highly Coherent, Microcavity Brillouin Laser on Silicon" filed on Jun. 17, 2011, ii) U.S. Provisional Patent Application No. 61/496,440 entitled "Ultra Low Loss Wedge Waveguide and Resonator on a Chip" filed on Jun. 13, 2011, iii) U.S. Pat. No. 8,045,834, and iv) U.S. Utility patent application Ser. No. 13/494,707 entitled "Silica-on-Silicon Waveguides and Related Fabrication Methods" filed on Jun. 12, 2012, all of which are also incorporated herein by reference in their entirety.

STATEMENT OF GOVERNMENT GRANT

This invention was made with government support under Grant No. FA9550-10-1-0284 awarded by the Air Force (AFOSR) and under Grant No. HR0011-09-C0122 awarded by DARPA. The government has certain rights in the invention.

FIELD

The present teachings relate to frequency comb generators. In particular, the present teachings relate to chip-based frequency comb generators having low repetition rates in the GHz region that permit direct detection of comb beat signals.

DESCRIPTION OF RELATED ART

Frequency combs, and more particularly, microcombs have been demonstrated using silica micro-toroids [3], $CaF_2$ diamond-milled rods [5, 6], silicon-nitride rings on silicon [8], high-index silica rings on silicon [10], and in fiber Fabry-Perots [7]. Various requirements such as GHz rate free-spectral range (FSR), integration with other optical components, power consumption, turn-on threshold power, are taken into consideration in various microcomb applications [4]. However, these requirements are difficult to achieve simultaneously, more so when attempts are made to obtain repetition rates less than 86 GHz in an on-chip micro-comb implementation approach. Lower-rate FSR is highly desirable so that a comb beat signal associated with the generated microcomb can be directly detected using a fast photodetector fr comb stabilization. However, the following scaling of turn-on threshold power with FSR makes it challenging to reduce FSR without increasing the turn-on threshold power.

$$P_{th} \approx \frac{(1+K)^3}{8K} \frac{n}{n_2} \frac{\omega}{\Delta\omega} \frac{A}{Q^2} \quad (1)$$

where K is the non-normalized external coupling rate, $n_2$ (n) is the nonlinear index (refractive index), $\Delta\omega$ ($\omega$) is the free-spectral-range (optical frequency), A is the mode area, and Q is the resonator optical Q factor. All other factors held fixed, it is clear that decreasing FSR (to achieve microwave rate comb operation) adversely impacts turn-on threshold power.

At the same time, of all parameters that impact threshold power, the optical Q factor has a significant impact upon exerts turn-on threshold power. Higher Q creates larger resonant build-up so that a given coupled power creates a greater Kerr nonlinear coupling of signal and idler waves. It also reduces oscillation threshold since optical loss is reduced. This dependence can enable a graceful transition from high-repetition rate comb operation (typical of chip-based microcavities) to the important microwave range required for beat note detection and comb stabilization.

It is therefore desirable to maximize Q thereby reducing turn-on threshold power for obtaining comb behavior at a low FSR. It is further desirable to provide such a device in a silicon-based integrated circuit thereby obtaining certain cost benefits.

SUMMARY

According to a first aspect of the present disclosure, a frequency comb generator is provided. The comb generator includes a chip-based disk resonator that includes a waveguide that is a part of a wedge structure fabricated from a silicon dioxide layer. The disk resonator has a low-threshold microwave to millimeter wave repetition rate control, with repetition rates ranging from 2.6 GHz when the disk resonator has a diameter of 25 mm to 220 GHz when the disk resonator has a diameter of 3 mm.

According to a second aspect of the present disclosure, a frequency comb generator includes a waveguide that is a part of a wedge structure fabricated from a silicon dioxide layer. The disk resonator has a microwave to millimeter wave repetition rate output when provided with a pump power threshold as low as 1 mW.

Further aspects of the disclosure are shown in the specification, drawings and claims of the present application.

BRIEF DESCRIPTION OF THE DRAWINGS

Many aspects of the present disclosure can be better understood with reference to the following drawings. The components in the drawings are not necessarily drawn to scale. Instead, emphasis is placed upon clearly illustrating various principles. Moreover, in the drawings, like reference numerals designate corresponding parts throughout the several views.

DETAILED DESCRIPTION

Figure 15:
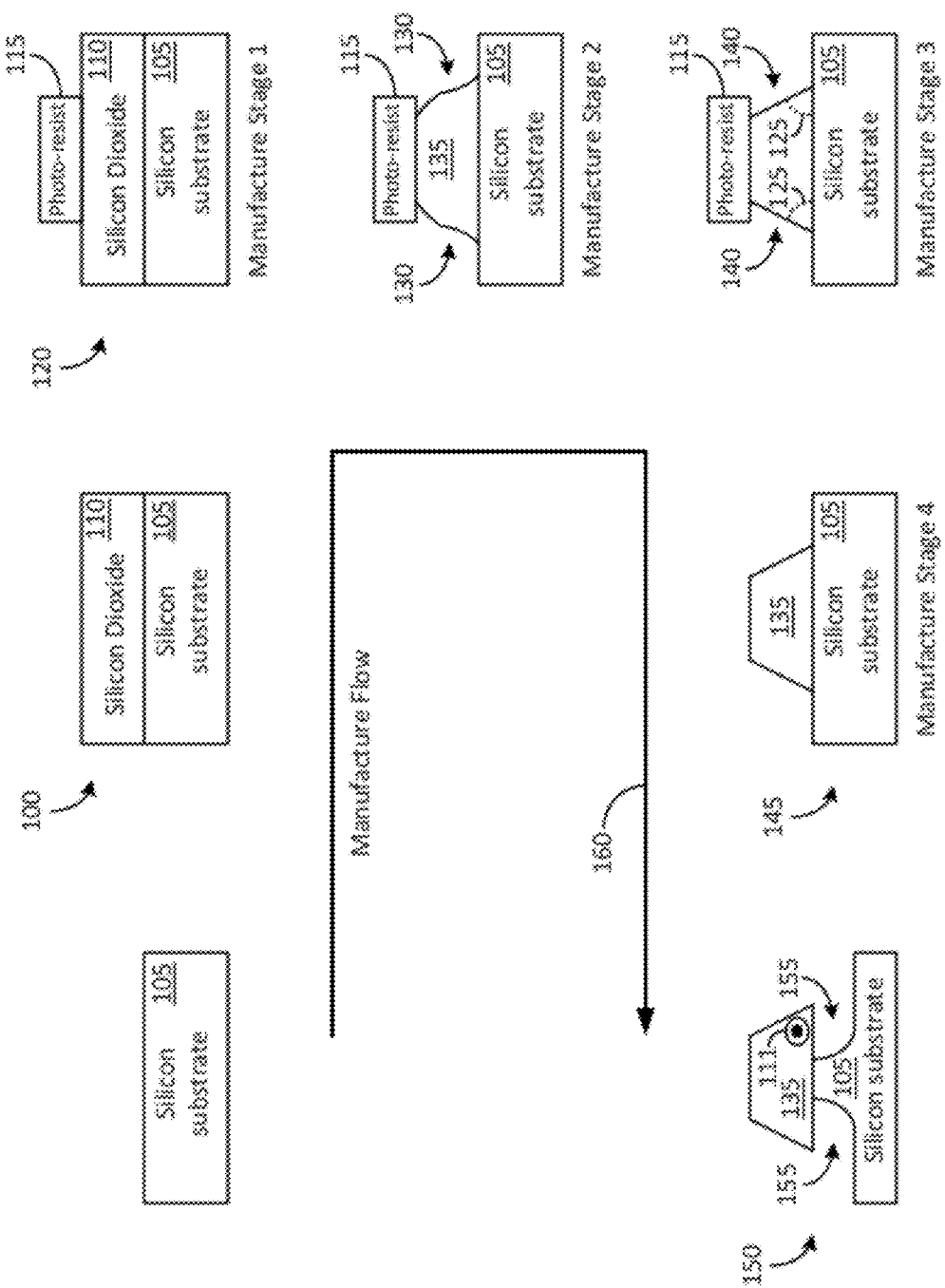
FIG. 15 shows a manufacture flow of a disk resonator in accordance with one embodiment of the invention.

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that terminology such as, for example, optical, photonic, silica, silicon and chip are used herein as a matter of convenience for description purposes and should not be interpreted literally in a narrowing sense. For example, the word "comb" may be alternatively referred to herein as a microcomb; the disk resonator may be alternatively referred to herein as a wedge resonator, a circular wedge resonator, a waveguide resonator or other such terms; optical propagation may be alternatively referred to herein as photonic propagation or light propagation; a light source may be indicated as providing a laser beam; and input light power may be referred to as input optical power. A person of ordinary skill in the art will understand that these terms may be used interchangeably and as such must be interpreted accordingly. It will be also be understood that the drawings use certain symbols and interconnections that must be interpreted broadly as can be normally understood by persons of ordinary skill in the art. As one example, of such interpretation, the sloping surface on manufacturing stage 2 in FIG. 15, is shown to have a certain non-linear profile. However, one of ordinary skill in the art will understand that the sloping surface may have protrusions and/or indentations in various other shapes. Furthermore, the region referred to herein as a "foot region" does not necessarily imply a close resemblance to a foot, but is more generally intended to indicate a surface area that is not smooth and harmonious. As can be understood by one of ordinary skill in the art, such rough surfaces negatively impact light propagation (via scattering, reflection, absorption, dissipation etc).

Figure 1:
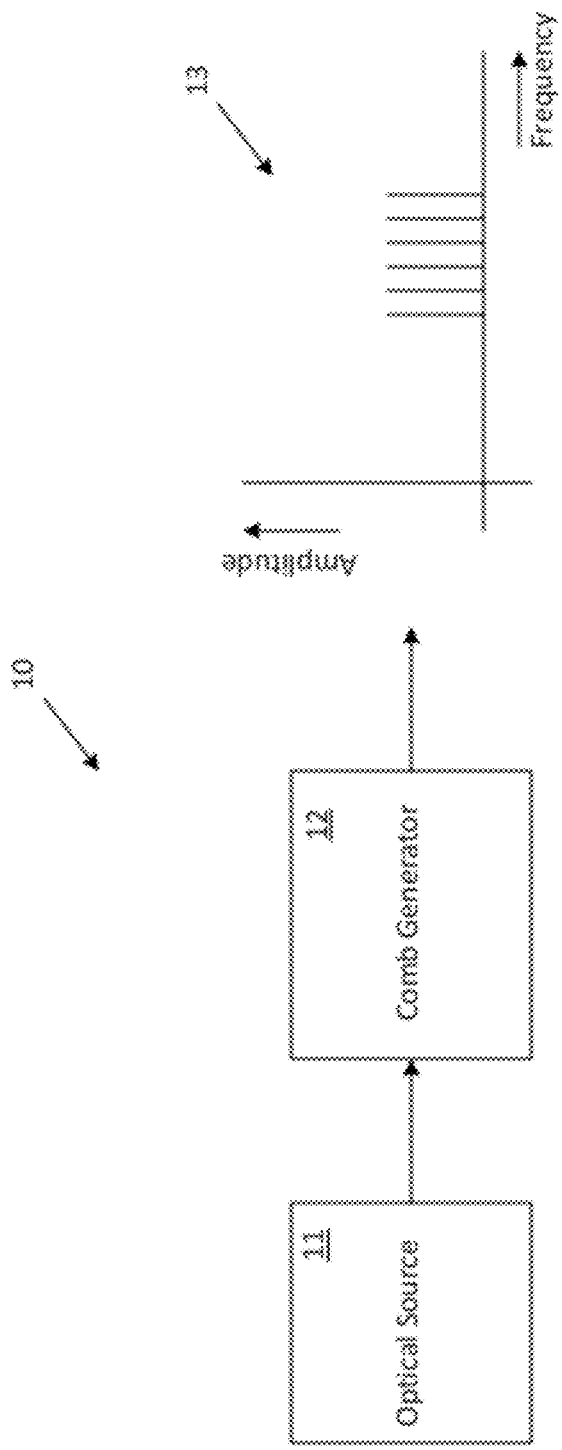
FIG. 1 shows an exemplary comb generator system in accordance with the invention.

Attention is now drawn to FIG. 1, which shows an exemplary comb generator system 10 in accordance with the invention. Optical source 11 may be implemented using a variety of laser sources. In the various embodiments described herein, optical source 11 is typically implemented using a tunable continuous-wave laser, e.g. an external cavity diode laser. Comb generator 12 includes a dielectric microresonator (not shown) that generates a comb 13 by optical parametric oscillation and cascaded four-wave mixing when pump power provided by optical source 11 to comb generator 12 exceeds an input optical power level threshold.

Furthermore, comb generator 12 is implemented in a silicon-based integrated circuit (IC) thereby providing various benefits including cost benefits and relative ease of integration with various optical elements such as optical fibers and optical waveguides.

The resonator (microresonator) contained inside comb generator system 10 is a chip-based resonator in accordance with the invention that provides Q factors as high as 875 million. Because the resonator is lithographically defined without the need for a prior art reflow process, not only is an ultra-high Q value obtained, but multiple devices may be advantageously fabricated across a wide range of free-spectral-range (FSR) values. Microcomb operation is achieved across a record span (2.6 GHz-220 GHz) of user-defined, repetition rates. Moreover, the resonators, which are available over a wide range of diameters are operative in a surface-loss-limited manner and feature an optical Q factor that varies nearly linearly with diameter for FSR values spanning the millimeter-wave to microwave range. These properties may decouple a strong dependence of pumping threshold on repetition rate (determined by cavity size) so that measured, turn-on power features minimal degradation as the comb 13 transitions from millimeter wave rates into microwave rates. Threshold turn-on power less than 5 mW is demonstrated for repetition rates between 4.4 GHz and 220 GHz.

Comb 13 has a spectral characteristic that is typical of a comb. However, advantageously, and in accordance with on embodiment of the invention, comb 13 has an extended range of repetition rates or free spectral range (FSR) that features a record span from 2.6 GHz to 220 GHz (nearly 100×) with threshold turn-on power as low as 1 mW. extends The use of chip-based microcombs operating at less than 40 GHz advantageously enables observation and measurement of various parameters (such as absolute and residual phase noise, frequency dispersion, coherence etc.) in the electrical domain.

Figure 2:
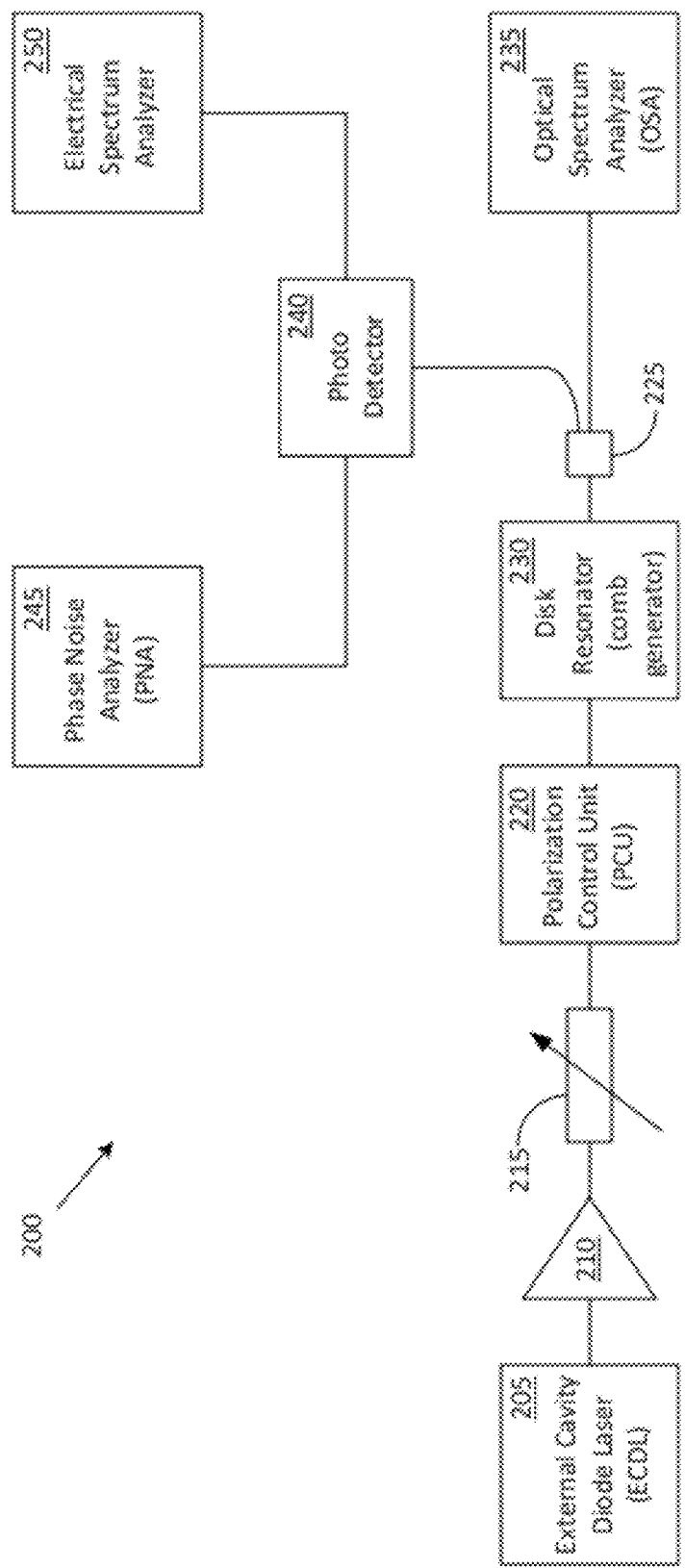
FIG. 2 shows some additional exemplary elements that may be included in a comb generator system in accordance with the invention.

FIG. 2 shows some additional exemplary elements that may be included in a comb generator system 200 in accordance with the invention. The optical source in this exemplary embodiment is an external cavity diode laser (ECDL) 205, which provides an optical output in the C-band that is coupled into an erbium doped fiber amplifier (EDFA) 210. The output of EDFA 210 is coupled into a polarization control unit (PCU) 220 via an attenuator 215. Attenuator 215 may be operated to gradually increase the amount of optical power provided from PCU 220 through a tapered fiber coupler to a comb generator indicated in FIG. 2 as a disk resonator 230. When the amount of optical power provided to disk resonator 230 reaches a certain input optical power level threshold, comb lines are generated in the disk resonator by optical parametric oscillation and cascaded four-wave mixing, which are coupled via the same tapered fiber coupler (and an optical splitter 225) for monitoring and/or photo-detection if so desired.

Spectrum monitoring may be performed using optical spectrum analyzer (OSA) 235. In one embodiment, optical spectrum analyzer 235 may be selected to display signals in the range of 600 nm to 1700 nm, while in another embodiment, spectrum analyzer 235 may be selected to cover an infrared range from 1200 nm to 2400 nm.

Photo detector 240 may be used to observe the comb in the electrical domain. In one embodiment, photo detector 240 is a high-speed photo detector having a bandwidth of about 25 GHz. A photocurrent generated by photo detector allows observation and analysis of a beat note in an electrical spectrum analyzer 250. Phase noise analyzer (PNA) 245 may be used for measuring phase noise in the generated comb.

The input optical power level provided to disk resonator 230 and the taper fiber coupling parameters may be adjusted by monitoring the comb spectrum while scanning ECDL 205 across a cavity resonance. Once tuned, ECDL 205 may be thermally locked at resonance as disclosed in [22].

When the input optical power level exceeds a threshold value, signal and idler lines appear at the output of disk resonator 230 accompanied by weaker, higher-order four-wave-mixing lines.

Figure 3:
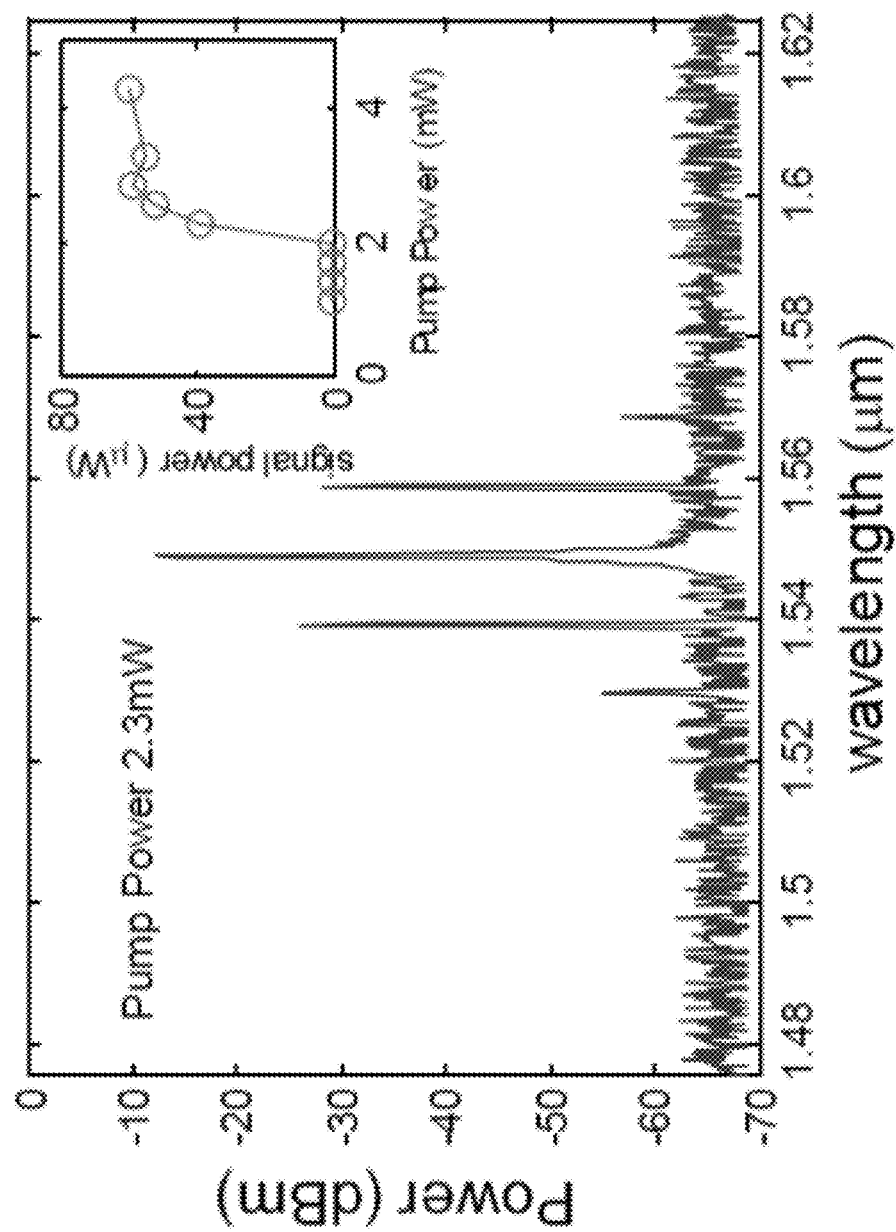
FIG. 3 shows an optical spectrum of a comb generated by a first exemplary comb generator at an input optical power level just above threshold, along with an inset figure that shows the power of first generated comb lines versus input optical power levels.

FIG. 3 shows an optical spectrum of a comb generated by a first exemplary comb generator (specifically a disk resonator of 2 mm diameter and an intrinsic Q of about 300 million) at an input optical power level just above threshold, along with an inset figure that shows the power of the first generated comb lines versus input optical power levels (indicated as "pump power (mW)").

As can be seen from FIG. 3, when the coupled, pump power exceeds the input optical power level threshold (alternatively referred to herein as turn-on power, pump power, pump threshold etc), which in this exemplary embodiment, is about 2 mW, signal and idler lines appear in the spectrum accompanied by weaker, higher-order four-wave-mixing lines. The spectrum has an FSR of about 33 GHz. Only modest pumping above the power level threshold is required to generate a dense comb spectrum with lines spaced one-FSR apart.

Figure 4:
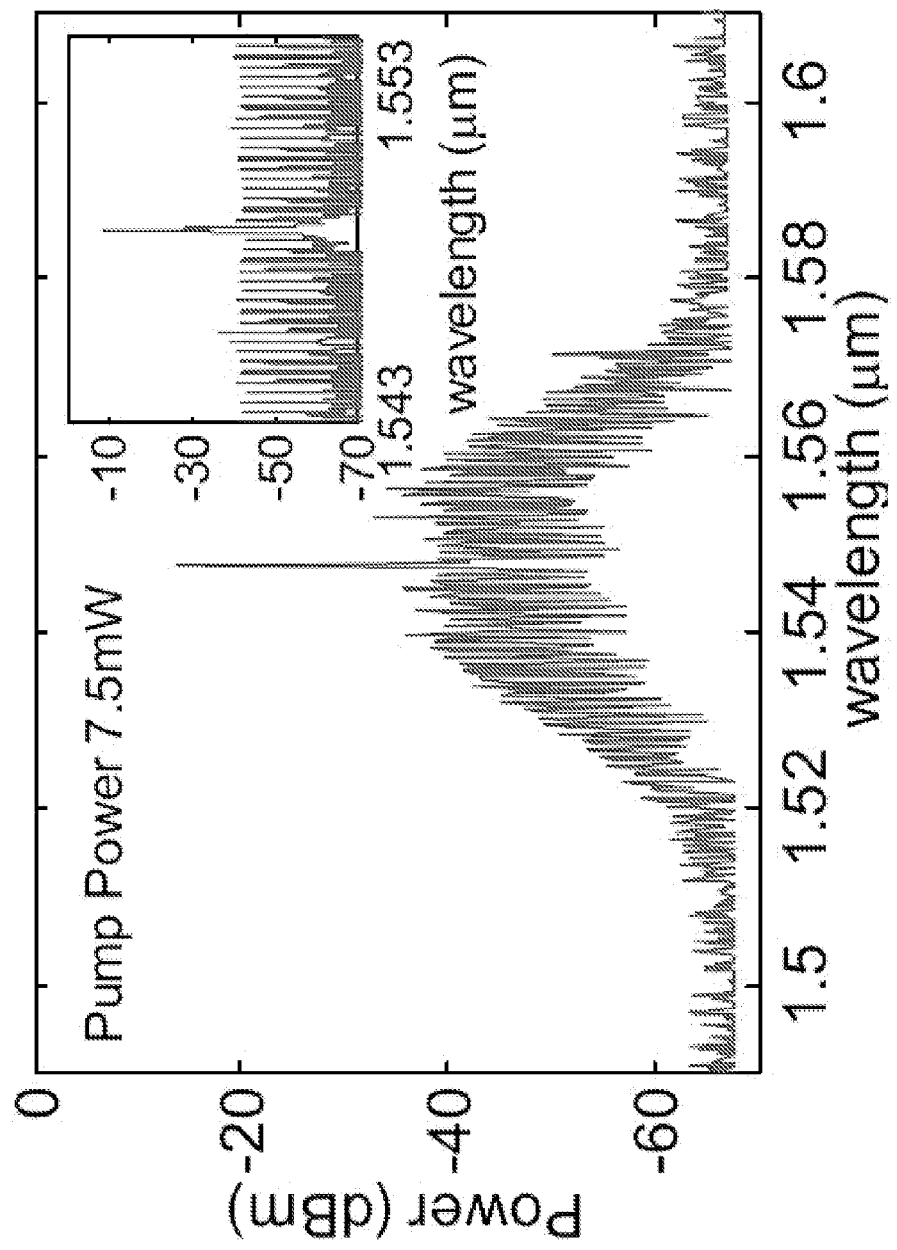
FIG. 4 shows an optical spectrum of the comb generated by the first exemplary comb generator at a higher input optical power level along with an inset figure that shows a reduced span scan of this comb.
Figure 5:
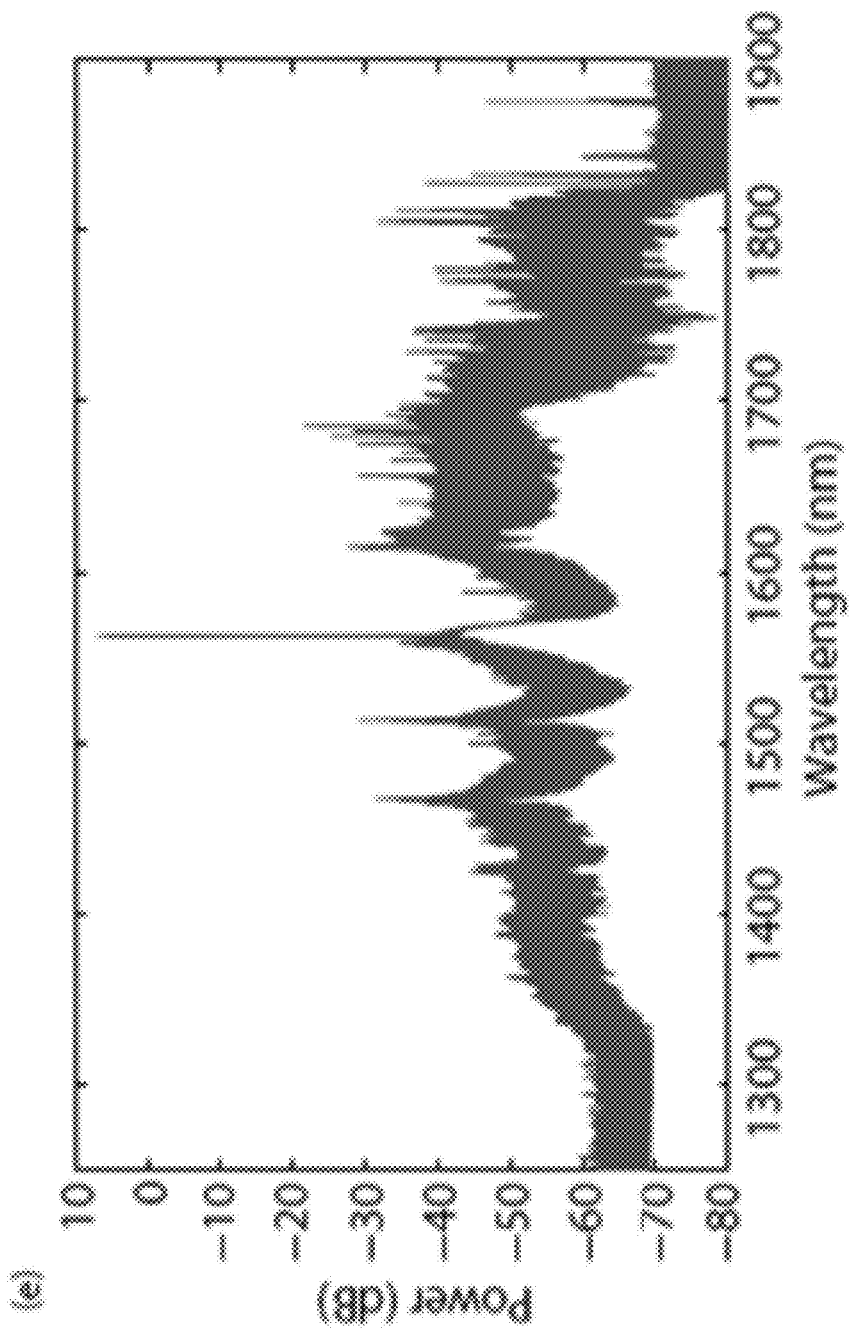
FIG. 5 showing a broadband comb spectrum with 62 THz span (1320 nm to 1820 nm), 33 GHz repetition rate with coupled pump power 200 mW in a 2 mm disk resonator.

About 200 comb lines are generated with coupled pump power of only 7.5 mW (as shown in FIG. 4). Further increase of the pump power to 200 mW leads to a broad-band comb spectrum from 1320 nm to 1820 nm. This spectrum spans nearly half an octave (62 THz) and contains about 1900 comb lines for a 33 GHz comb (as shown in FIG. 5).

¾ octave span operation in a continuous spectrum (106 THz, 1180 nm-2020 nm) may be obtained by using a larger FSR device (66 GHz). In this context, attention is drawn to FIG. 6, which shows a broadband comb spectrum having a 106 THz span (1180 nm-2020 nm) and a repetition rate of 66 GHz that is generated by a second exemplary comb generator (specifically a disk resonator of 1 mm diameter) in accordance with the invention.

Figure 6:
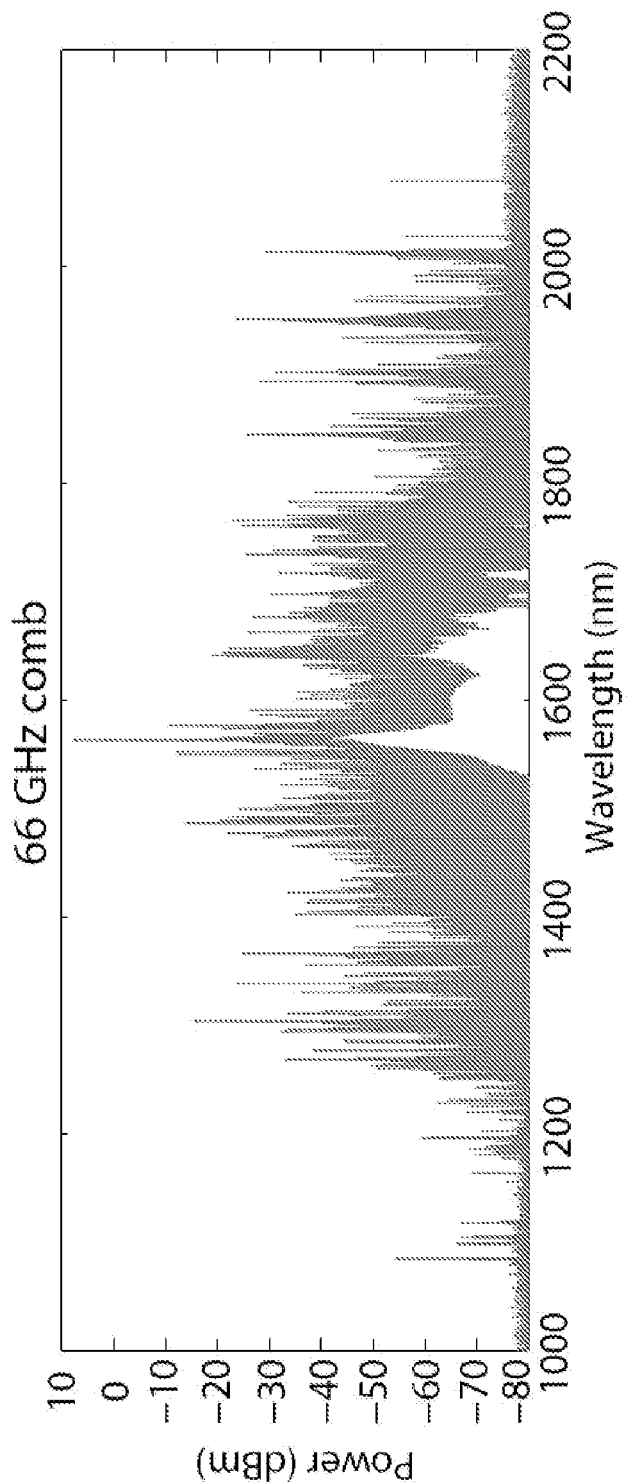
FIG. 6 shows a broadband optical spectrum of a 66 GHz comb from 1180 nm to 2020 nm (106 THz span) generated by a second exemplary comb generator that is a 1 mm disk resonator.
Figure 7:
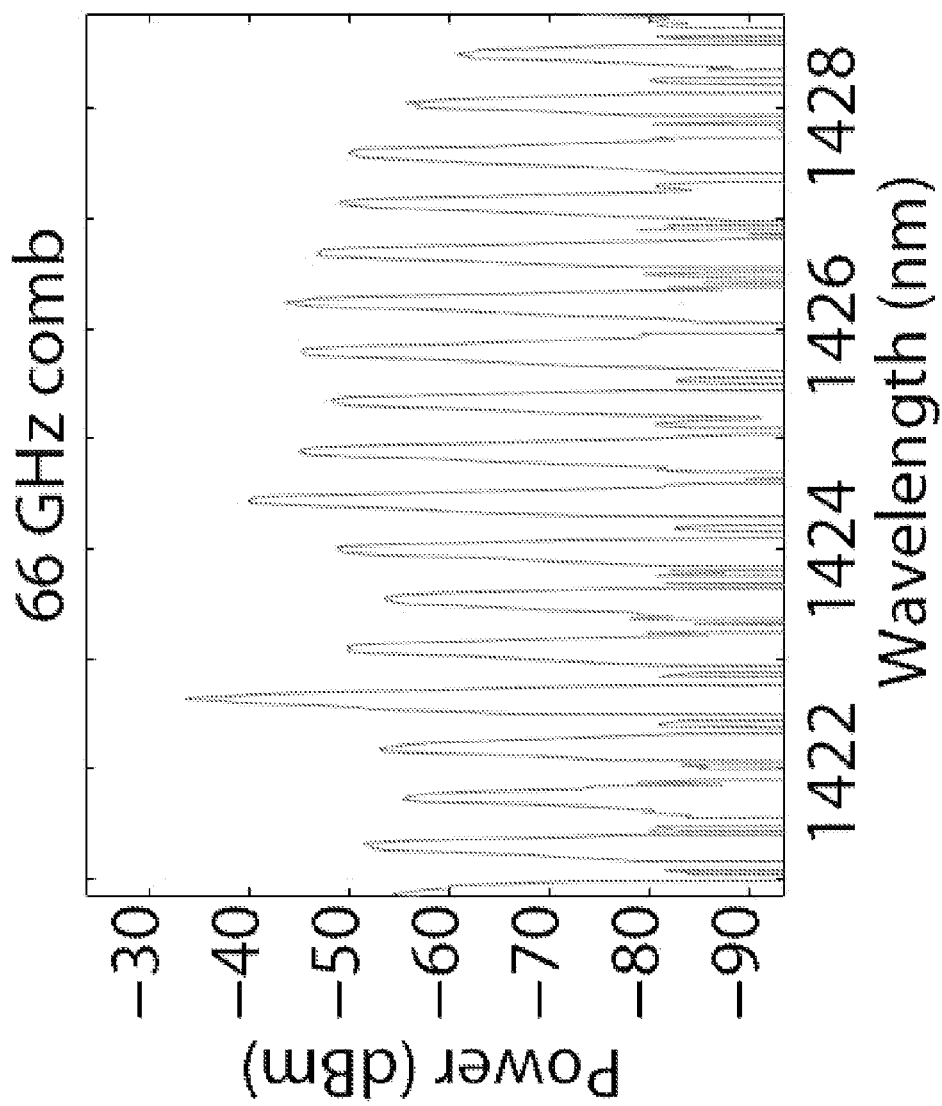
FIG. 7 shows a spectrum display obtained by applying a reduced span upon the broadband optical spectrum shown in FIG. 6.

FIG. 7 shows a spectrum display obtained by applying a reduced span upon the broadband comb spectrum shown in FIG. 6. The reduced span display shows the comb lines in more detail.

Figure 8:
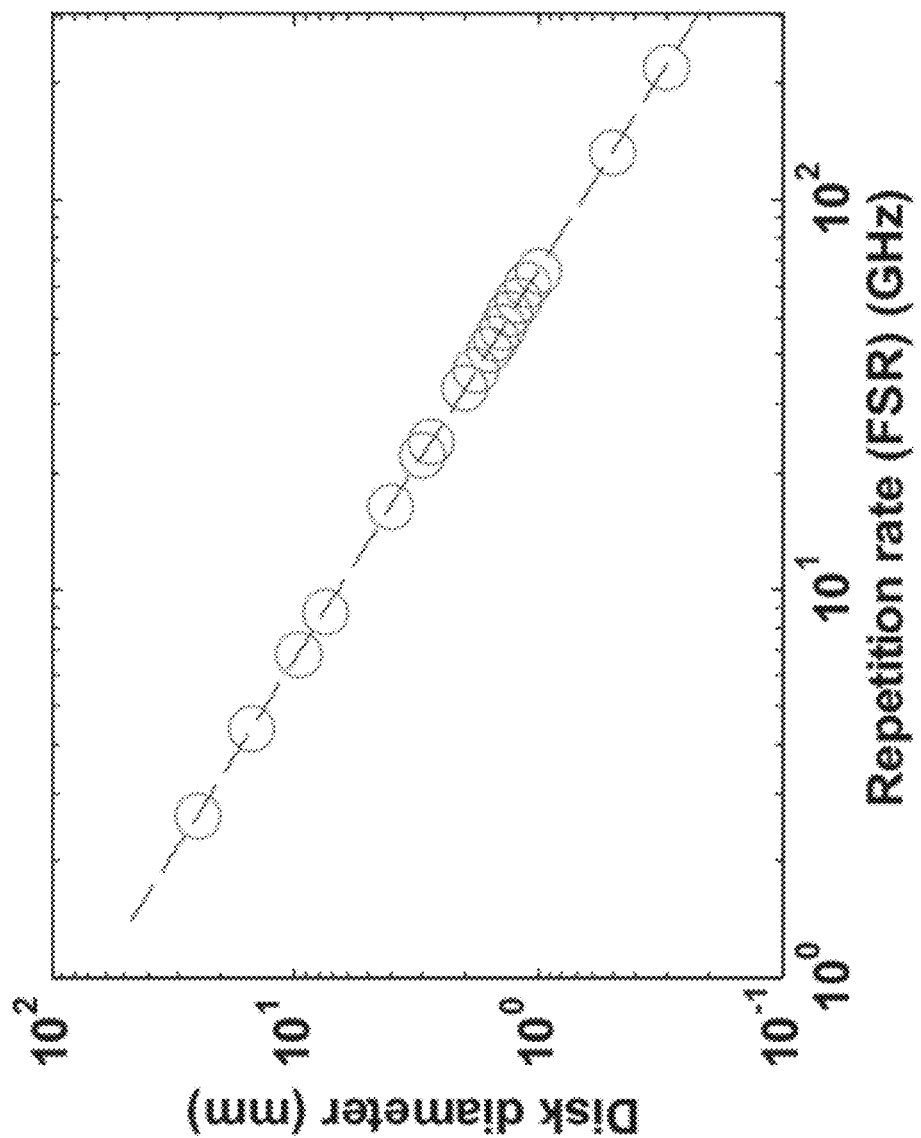
FIG. 8 shows a graph that charts repetition rates (FSRs) of the demonstrated microcombs from 2.6 GHz to 220 GHz versus disk resonator diameters.

FIG. 8 shows a graph that charts repetition rates (FSRs) of the demonstrated microcombs from 2.6 GHz to 220 GHz versus disk resonator diameters. The repetition rates demonstrated experimentally are shown by circles in FIG. 8. Certain repetition rates demonstrated in this invention are: 2.6 GHz, 4.4 GHz, 6.8 GHz, 8.8 GHz, 16.4 GHz, 22 GHz, 33 GHz, 41 GHz, 55 GHz, 66 GHz, 132 GHz and 220 GHz.

Microcomb repetition rates spanning the entire microwave range from 2.6 GHz (25 mm diameter) to 220 GHz (0.3 mm) may be obtained in accordance with the invention. Ready access to a wide range of microwave repetition rates is important for the application of microcombs in a variety of fields including: optical clocks [23], astrophysical spectral calibration [24], and line-by-line pulse shaping [9].

The threshold relation for parametric oscillation in a microcavity [1] can be manipulated into the Equation 1 shown below:

$$P_{th} \approx \frac{(1+K)^3}{8K} \frac{n}{n_2} \frac{\omega}{FSR} \frac{A}{Q^2} \quad \text{(Equation 1)}$$

All other factors held fixed, it is clear that decreasing FSR (to achieve microwave-rate comb operation) adversely impacts turn-on power. Moreover, in whispering-gallery resonators, the mode area, A, will generally increase with decreasing FSR, thereby causing further degradation of the turn-on power. At the same time, it is interesting to note the positive impact of increasing Q factor. Higher optical Q creates larger resonant build-up so that a given coupled power induces a larger Kerr nonlinear coupling of signal and idler waves. Moreover, it reduces oscillation threshold since optical loss is also lowered. The combined effect leads to the inverse quadratic behavior in the Equation (1). This dependence can enable a graceful transition from high-repetition rate comb operation (typical of chip-based microcavities) to the important microwave range required for beat note detection and comb stabilization. In particular, the dependence of optical Q in whispering-gallery resonators versus resonator diameter (FSR) depends strongly on whether the round-trip losses are set by surface or bulk optical losses. In the bulk-loss limit, the Q does not depend on FSR and Equation (1) shows that the turn-on power will quickly degrade as a bulk-loss-limited comb transitions from millimeter-wave to microwave-rate repetition rates. However, in surface-loss-limited resonators, the resonator Q factor actually increases (nearly proportionally) with resonator diameter. This happens because the optical field strength at the scattering or absorption centers on the resonator surface decreases with increasing resonator diameter. In such cases, the surface-loss-limited behavior of Q can offset the FSR and area dependences, leading to low, turn-on power microwave-rate operation across a very wide range of repetition rates.

Figure 9:
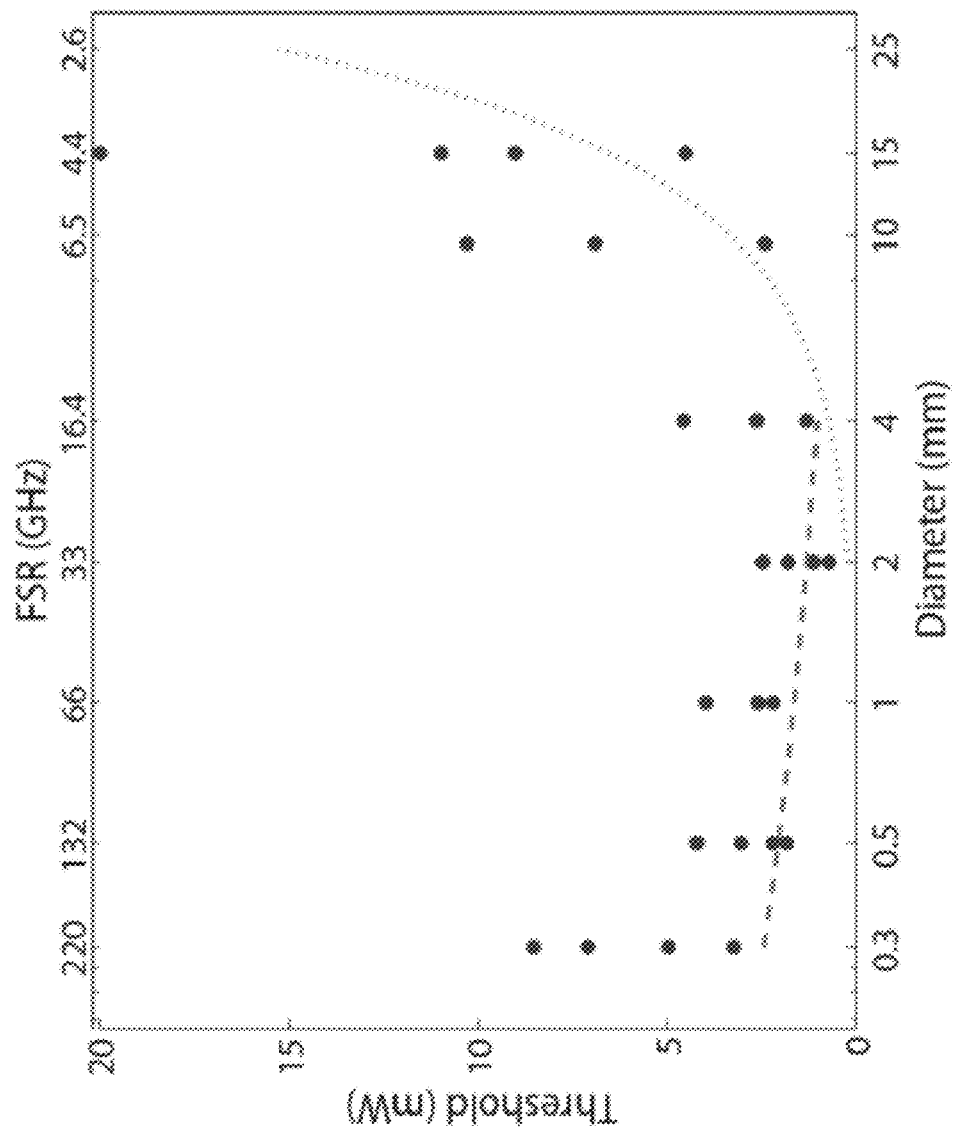
FIG. 9 shows measured microcomb threshold versus resonator diameter (lower axis) and FSR (upper axis). Also shown are the trend curves of the threshold data using $D^{-1/3}$ (dashed curve) and $D^{5/3}$ (dotted curve).

FIG. 9 shows a plot of the parametric oscillation threshold versus diameter (lower axis) and FSR (upper axis) for several devices having a wide range of diameters. Threshold levels associated with using different resonator pump modes are displayed. The resulting variation of threshold results from changes in both Q factor and modal area for each pump mode. The fundamental transverse mode of the device is expected to give the lowest threshold turn-on power since it has the highest Q and smallest mode area [17, 18]. The observed behavior of threshold versus FSR from 2.6 GHz (25 mm diameter) to 220 GHz (0.3 mm) can be understood by considering the dependence of both Q and the mode area, A, versus diameter D. Modeling shows that the mode area, A, scales approximately like D2/3. Over the range of diameters for which the resonator is surface-loss-limited, the Q factor scales approximately linearly with D. In this surface-loss-limited regime, Equation (1) predicts that the threshold scales like: $P_{th} \sim D^{-1/3}$ . Ultimately, at large diameters, the Q factor will saturate to a high, constant value. In this limit, Equation (1) gives: $P_{th} \sim D^{5/3}$. These two regimes are illustrated in FIG. 9 by the trend curves: $D^{-1/3}$ and $D^{5/3}$ (dotted curve). The threshold is below 5 mW over a range of FSRs spanning 4.4 GHz to 220 GHz, demonstrating the beneficial effect of surface-loss-limited Q scaling.

Moreover, the resonator FSR and hence repetition rate can be precisely controlled to 1:20000 [18]. The 2.6 GHz repetition rate is the smallest demonstrated to date for any microcomb and begins to access rates available using traditional Ti:Sapphire frequency combs [4].

Figure 10:
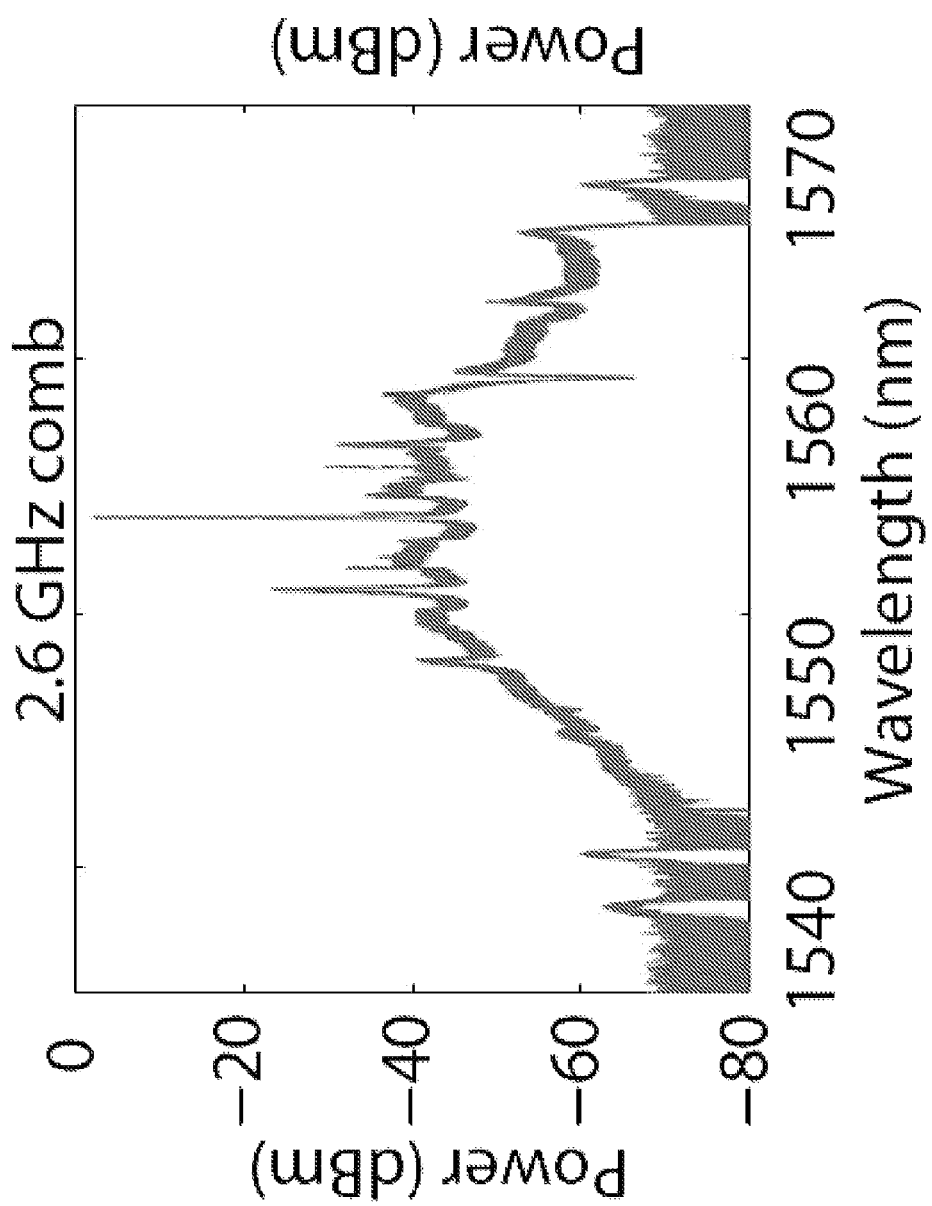
FIG. 10 shows an optical spectrum of a 2.6 GHz comb generated by a third exemplary comb generator, which is a 25 mm disk resonator.
Figure 11:
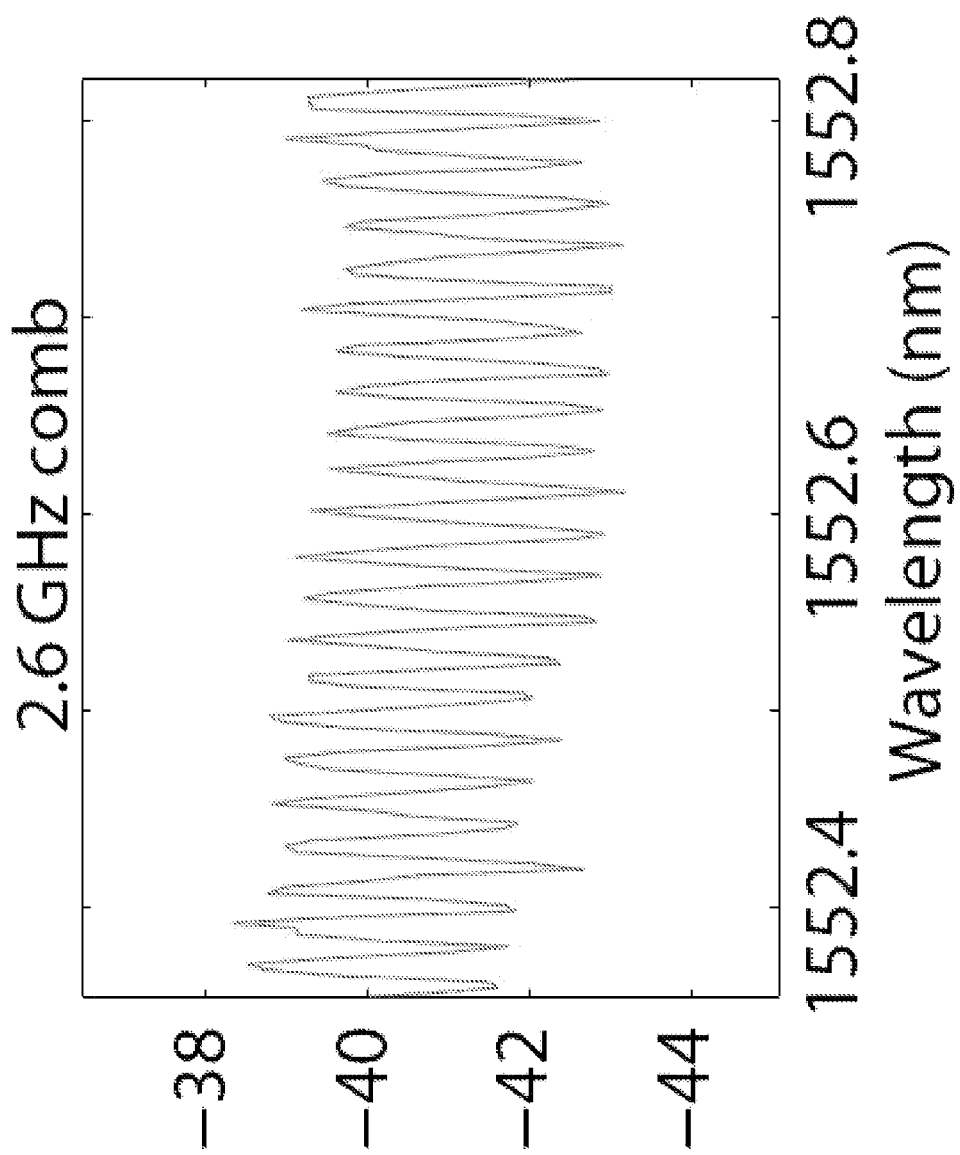
FIG. 11 shows a reduced span comb spectrum generated by the third exemplary comb generator.

FIG. 10 shows an optical spectrum of a 2.6 GHz comb generated by a third exemplary comb generator, specifically a disk resonator of 25 mm diameter, while FIG. 11 shows a reduced span comb spectrum generated by the third exemplary comb generator in which the individual comb lines are just resolved by an optical spectrum analyzer (such as OSA 235 shown in FIG. 2).

Figure 12:
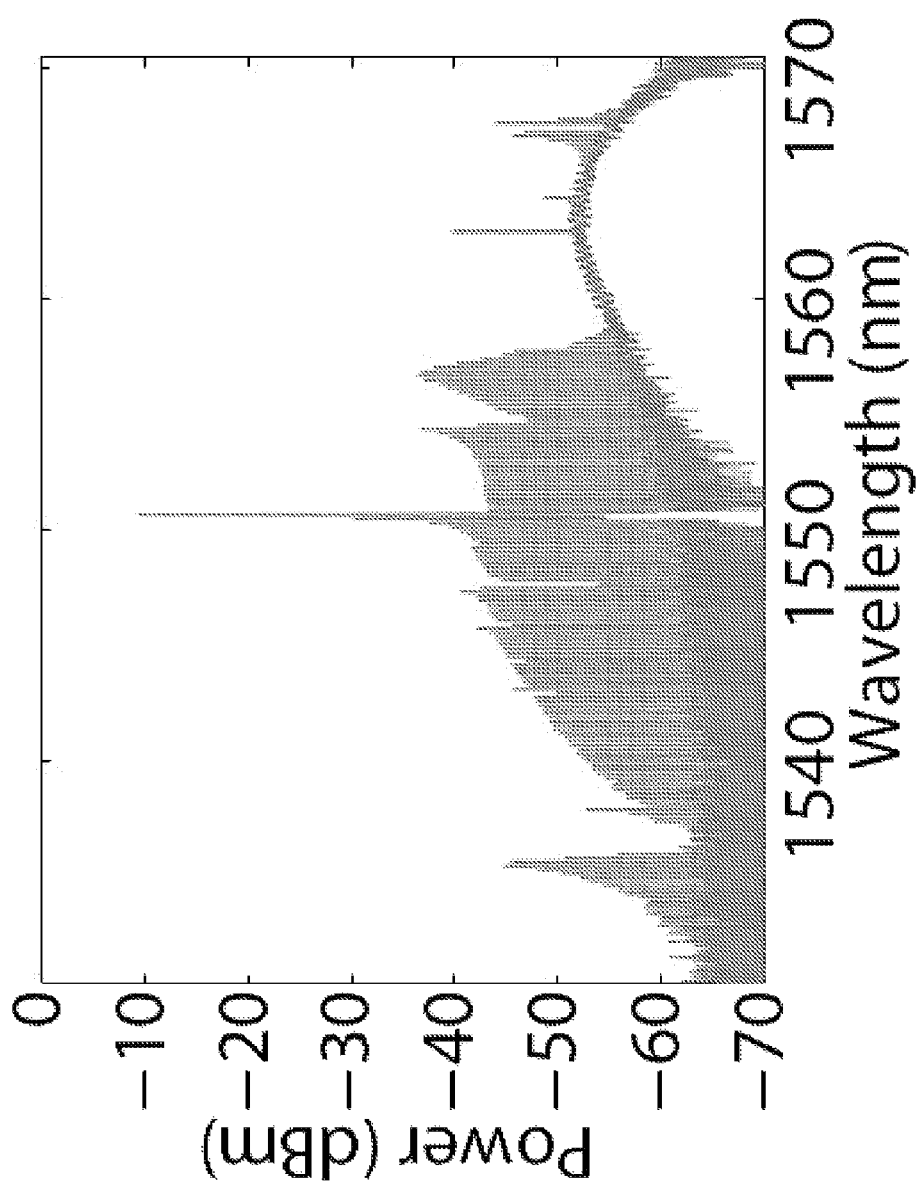
FIG. 12 shows a 21.9 GHz comb generated in accordance with the invention.
Figure 13:
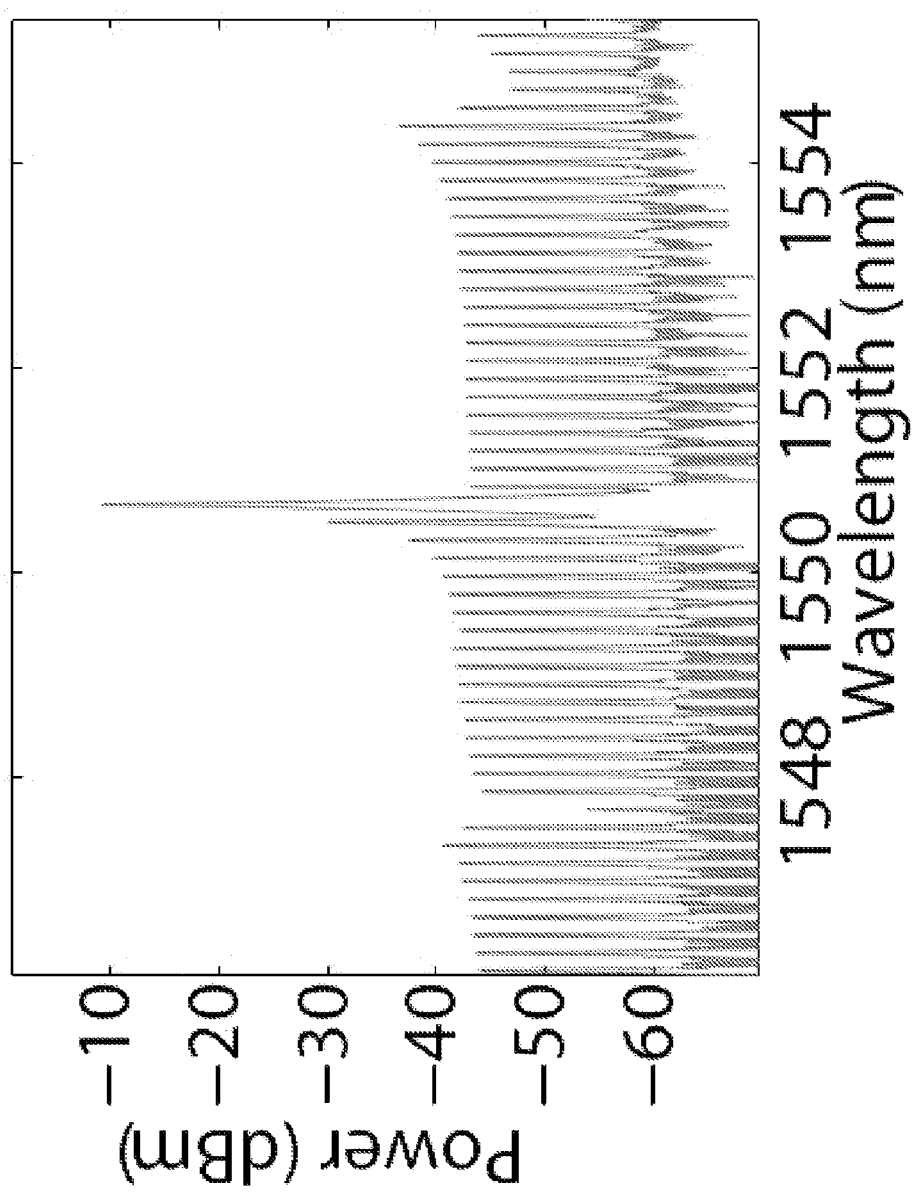
FIG. 13 shows a reduced span view of the 21.9 GHz comb of FIG. 12 with comb lines resolved.

In one exemplary implementation (similar to the setup shown in FIG. 2), a fast photo-receiver with bandwidth 25 GHz is used for demodulating a comb generated by a disk resonator in accordance with the invention. The comb is generated using a 3 mm disk (FSR=21.9 GHz). FIG. 12 shows a 21.9 GHz comb, while FIG. 13 shows a reduced span view of the comb with comb lines resolved.

Figure 14:
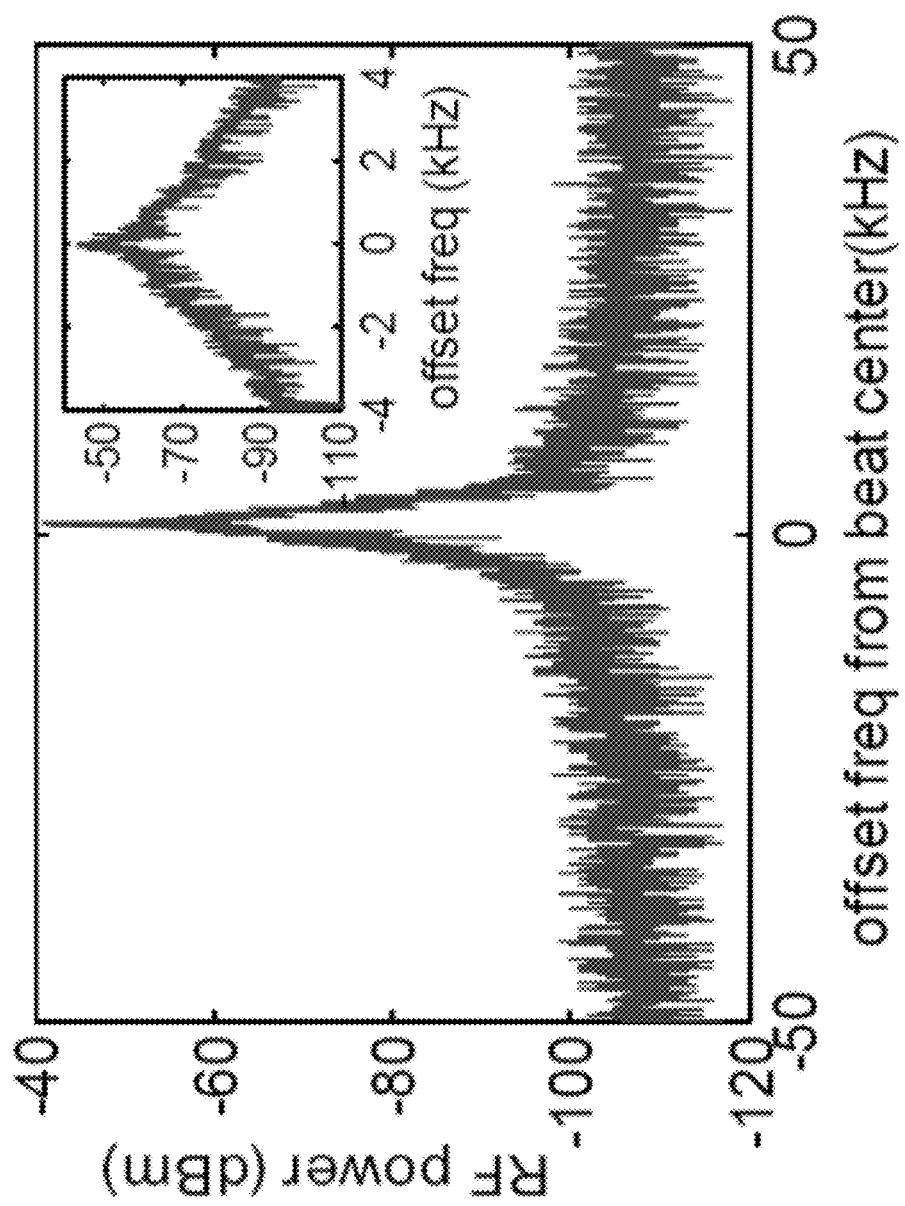
FIG. 14 shows a microwave beat note of the 21.9 GHz comb, with an inset view showing a zoom measurement of the beat note.

FIG. 14 shows a microwave beat note of the 21.9 GHz comb, with an inset view showing a zoom measurement of the beat note. In this exemplary implementation, the comb contained approximately 170 lines, spanning about 30 nm. Without any external locking, the free-running, beat note spectrum features a 3 dB linewidth of less than 100 Hz (Resolution Bandwidth limited) illustrating the high coherence of the comb. More typically, the beat note ranges in width between several kHz to MHz levels depending upon pump detuning and pumping level.

Attention is now drawn to FIG. 15, which shows a few stages of manufacture of a disk resonator in accordance with one embodiment of the invention. The disk resonator is alternatively referred to herein (mainly with reference to FIGS. 15-18) as a wedge resonator 150 because of the presence of a wedge in the disk resonator, the wedge being used as a waveguide for propagating light and generating resonance in the disk resonator.

The manufacture flow (indicated by arrow 160) begins with a silicon substrate 105. Silicon substrate 105, which for example, may be a 100 prime grade float zone silicon wafer, is placed in a furnace that is raised to a suitable temperature at which a top layer of the silicon substrate 105 turns into a silicon dioxide layer 110.

Significantly, during this heating process, steam is introduced into the furnace. In other words, silicon substrate 105 is subjected to heat in a humid atmosphere for forming silicon dioxide layer 110. While the water constituent is desirable at this stage of manufacture, it is desirable that any residual moisture in the product be eliminated subsequently.

Consequently, the water content is purged by placing assembly 100 in a furnace operating at 1000 degrees Celsius for approximately a 24 hour period. This drying out process contributes to a significant level of reliability in obtaining a desirably high Q factor in the manufactured product.

In manufacture stage 1, an assembly 120 is formed by applying a photo-resist layer 115 upon silicon dioxide layer 110 in the form of a suitable pattern. Various patterns may be used. Specifically, a circular pattern may be used to obtain a waveguide such as the disk resonator in accordance with the invention. In one exemplary embodiment, the application of photo-resist layer 115 is patterned using a stepper on thermally grown silicon dioxide layer 115 having a thickness in the range of 2-10 microns.

In manufacture stage 2, assembly 120 is immersed in a suitable etchant, such as, for example, a buffered hydrofluoric acid solution. After immersion for a certain period of time, the etchant acts upon silicon dioxide layer 110 to not only expose a portion of the top surface of silicon substrate 105, but also to form a wedge structure 135 below photo-resist layer 115. In contrast to the exposed top surface of silicon substrate 105, which is relatively smooth, the sloping surface of the wedge structure 135 has a certain roughness as well as a deformity in the form of what is referred to herein as a "foot region" 130.

The surface roughness of wedge structure 135, as well as the presence of foot region 130, is undesirable because both these features create a negative impact on light propagated inside the wedge structure 135, more specifically on the Q factor of the finished product. As is known, the Q factor defines a photon storage time in a waveguide structure, with a higher Q indicating a larger storage time.

Consequently, manufacturing stage 2 is followed by manufacturing stage 3, wherein the period of time selected for manufacturing stage 2 is specifically extended in order to obtain a higher Q by eliminating foot region 130 and producing a smooth, linear surface having a desirable slope angle 125 in the wedge structure 135.

The desirable slope angle 125 ranges from about 7 degrees to about 90 degrees. Prior art solutions have expressly aimed at manufacturing and using angles below 27 degrees. However, such small angles do not provide satisfactory performance in terms of obtaining high Q values, and furthermore suffer from certain handicaps during manufacture as well as in product structure. One of the handicaps associated with prior art manufacturing is the need to include a reflow process in order to obtain high Q in a lossy foot wedge region. As for product structure, one of the handicaps pertains to a relatively large spacing requirement between two adjacent elements such as between a pair of waveguide channels. This spacing aspect may be better understood from additional description below.

Slope angle 125 may be empirically controlled in various ways. In one implementation, slope angle 125, as well as the surface roughness of the wedge structure 135, is controlled by selecting an appropriate adhesion factor incorporated into photoresist layer 115. The adhesion factor incorporated into photoresist layer 115 may be varied by using various types of adhesion promoters. In other words, for a given period of time, to obtain a larger slope angle, a promoter that provides higher adhesion may be used because such a promoter prevents fast penetration between the photoresist layer 115 and silicon dioxide layer 110.

In manufacture stage 4, photo-resist layer 115 is removed by employing a cleaning process, after which assembly 145 is exposed to a xenon difluoride ($XeF_2$) environment that etches a portion of silicon substrate 105 and forms a support pillar that supports wedge structure 135. The removal of the portion of silicon substrate 105 results in an undercut below wedge structure 135, the undercut serving to isolate light 111 propagating inside wedge structure 135 from coupling into silicon substrate 105. The undercut may be set to various values. For example, in one embodiment, the undercut is set to about 100 microns for a 1 mm diameter wedge structure, and in another embodiment, the undercut is set to over 150 microns for a 7.5 mm diameter wedge structure.

A disk resonator fabricated upon a chip, and having a Q factor of about 875 million may be manufactured via the method of manufacture described above, wherein a disadvantageous prior art reflow step has been eliminated. This Q factor is achievable in an important size range of diameters greater than 500 microns, and may be used for realizing microwave rate FSR. A disk resonator fabricated using this method of manufacture not only provides a new benchmark for Q factor on a chip, but also provides, for the first time, full compatibility of this ultra-high Q device class with conventional semiconductor processing.

Furthermore, it will be understood that while the method described above described the creation of a silicon dioxide layer upon a silicon substrate, the method may be similarly applied using substrates other than silicon.

Figure 16:
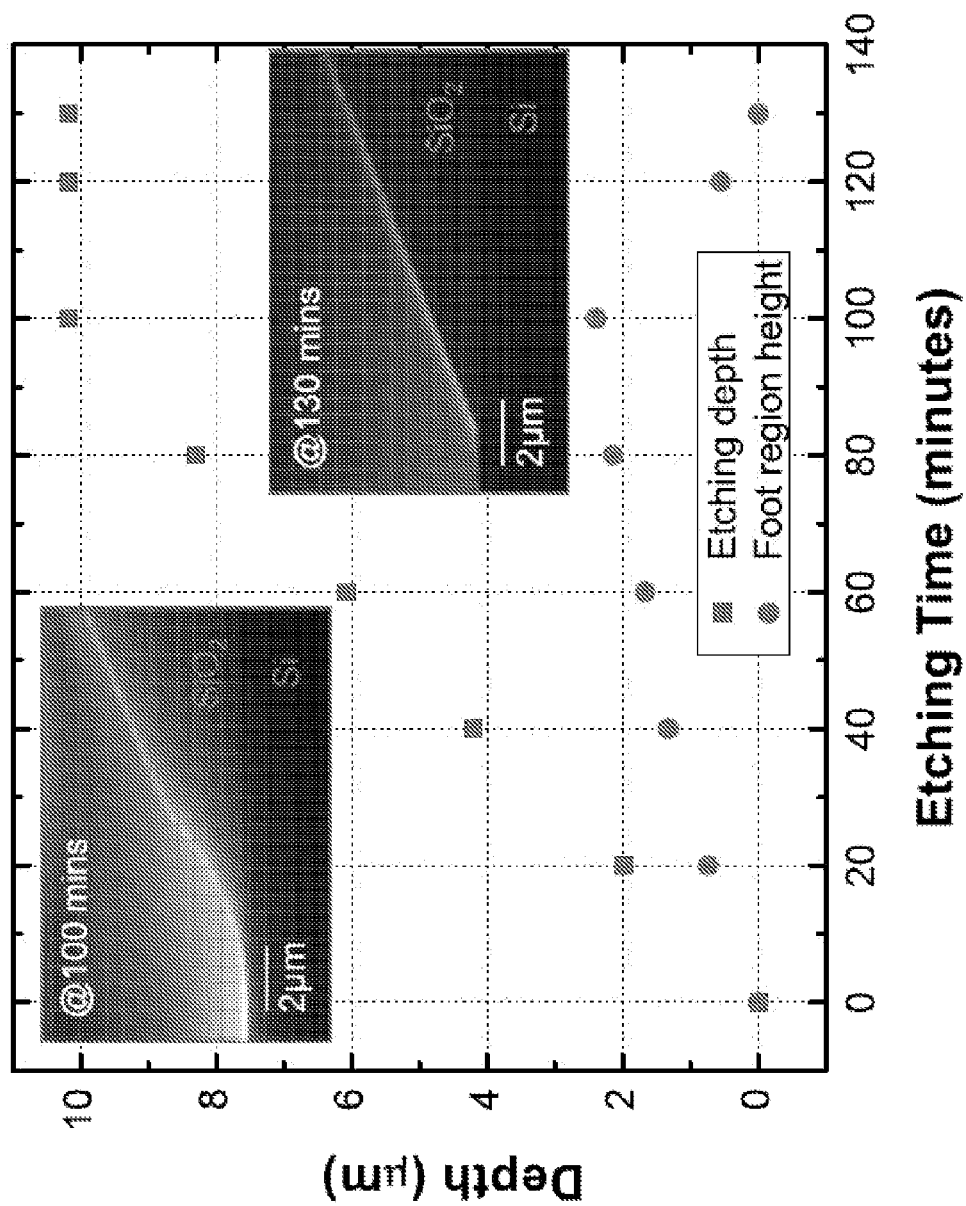
FIG. 16 shows a graph that shows the effect of etching time when a 10 um thick silicon assembly is etched in accordance with the manufacture flow shown in FIG. 15.

FIG. 16 shows a graph indicating the effect of etching time on appearance of the foot region during etching. In this particular example, the silica layer has a thickness of about 10 micron. As can be understood, extending the etching time from 100 minutes (where the foot region is present) to 130 minutes eliminates the foot region and produces a smooth (linear) sloping surface.

Figure 17:
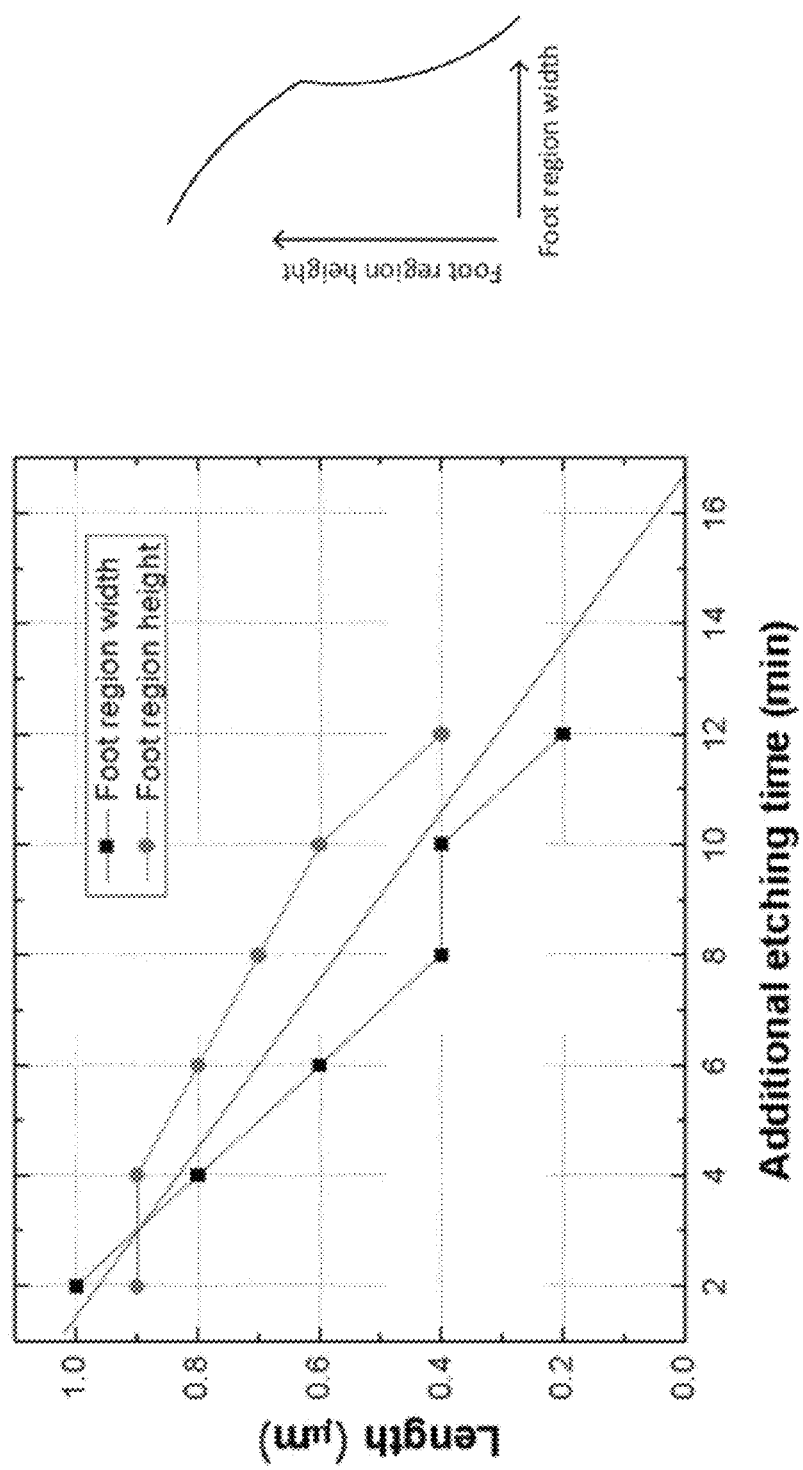
FIG. 17 shows a graph that provides some information pertaining to an additional etching time that is used to eliminate a foot region when a 2 um thick silicon assembly is etched in accordance with the manufacture flow shown in FIG. 15.

FIG. 17 shows a graph that provides some additional information pertaining to the extended etching time. As can be observed from the graph, the extended etching time may be varied in part, based on the height and/or the width of the foot region, with a greater period of time being used to etch excess material when the foot width and/or height is larger.

Figure 18:
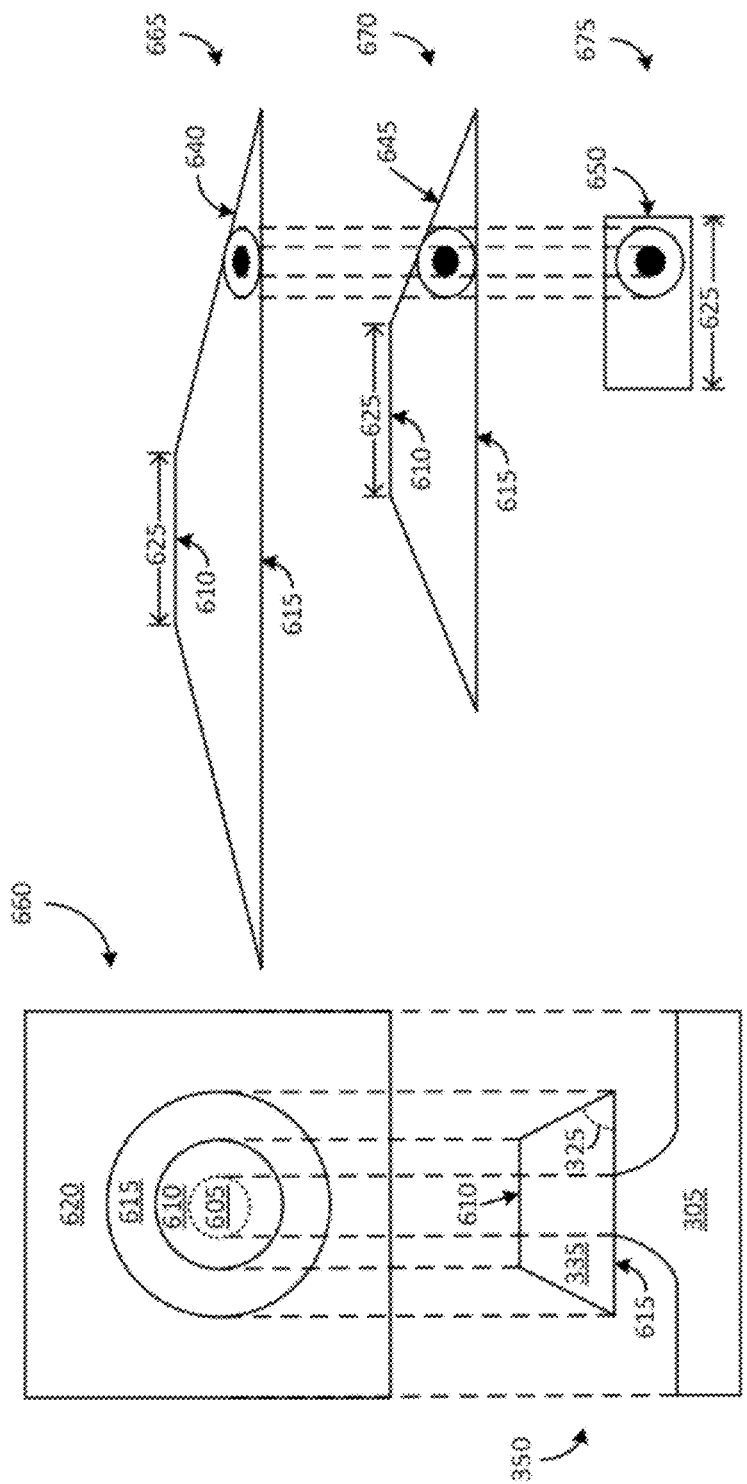
FIG. 18 shows several cross-sectional views of associated with a circular wedge resonator to illustrate the effects of slope angles on light propagation through a waveguide portion of the disk resonator.

FIG. 18 shows several cross-sectional views associated with a circular wedge resonator 150 (disk resonator) to illustrate the effects of slope angles on light propagation through a waveguide portion of the resonator. View 360 provides a top view of circular wedge resonator 150. In this top view, area 305 corresponds to the support pillar seen through the silicon dioxide wedge structure 135, which is transparent as a result of the silicon dioxide material (which is basically, glass). The area 310 corresponds to the top surface of wedge structure 135, area 315 to the bottom surface of wedge structure 135 and area 320 corresponds to the silicon substrate 105. The concentric, non-overlapping area between circular areas 310 and 315 corresponds to the sloping surface of circular wedge resonator 150. While various portions of the wedge structure may be used to define the dimensions of the wedge resonator, in one embodiment, the diameter of area 315 is used to distinguish one resonator over another (for example, 0.5 mm and 25 mm disk resonators as referred to herein).

Various configurations of this sloping surface will now be described in order to highlight the effects of slope angle 125 (in wedge resonator 150) upon photonic propagation through wedge structure 135 of circular wedge resonator 150.

When slope angle 125 is relatively acute (less than 27 degrees, typically around 7 degrees) as shown in embodiment 365, a distorted mode profile 340 is created during a fundamental TE mode of photonic propagation.

When slope angle 125 is greater, not only does mode profile 340 suffer less mode compression, but the widths of surfaces 310 and 315 may be made smaller in width than those of embodiment 365.

When slope angle 125 approaches 90 degrees, mode profile 340 suffers reduced mode compression and the widths of surfaces 310 and 315 become more optimally minimal. Consequently, in certain embodiments in accordance with the invention it is preferable to incorporate slope angles ranging from about 60 degrees to about 90 degrees. However, in certain other embodiments, it may be preferable for various other reasons, to incorporate slope angles down to around 7 degrees.

The description above that is made with reference to various figures illustrates certain aspects of the invention. Additional description provided below provides further insights into certain benefits and features.

Prior art approaches have taken into consideration the Q factor in a wedge-shaped resonator device fabricated of silica on a silicon wafer. [6]. Q factors as high as 50 million were obtained in these prior art approaches, which primarily focused on reducing optical loss by isolating the propagation mode from the lithographic blemishes near the outer rim of the resonator by using a shallow wedge angle. In contrast to the Q values obtained in the prior art solutions, the approach described herein results in an optical Q that is boosted by a factor of 15× beyond the earlier achieved values. An exemplary Q factor of 875 million has been achieved using various embodiments described herein. This Q factor corresponds to an equivalent waveguide loss of 0.03 dB/m.

While the devices in accordance with the invention may resemble the earlier geometry to some extent, these new devices derive ultra-high Q performance from overall changes to the etch process and the oxide growth. Specifically, the physical principle at work in the earlier structures, a shallow wedge angle to provide roughness isolation, is no longer required. Indeed, and in contrast to earlier work, larger wedge angles are desirable. For example, these larger wedge angles can range from 27 degrees to 90 degrees as described herein.

The ability to lithographically define ultra-high Q resonators as opposed to relying upon the reflow process enables a multi-order-of-magnitude improvement in control of resonator diameter and free-spectral-range (FSR).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the waveguides of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] T. J. Kippenberg, S. M. Spillane, and K. J. Vahala, Physical Review Letters 93, 083904 (2004).

[2] A. A. Savchenkov, A. B. Matsko, D. Strekalov, M. Mohageg, V. S. Ilchenko, and L. Maleki, Phys. Rev. Lett. 93, 243905 (2004).

[3] P. Del'Haye, A. Schliesser, O. Arcizet, T. Wilken, R. Holzwarth and T. J. Kippenberg, Optical frequency comb generation from a monolithic microresonator," Nature 450, 1214 (2007)

[4] T. J. Kippenberg, R. Holzwarth, and S. A. Diddams, "Microresonator-Based Optical Frequency Combs," Science 332, 555-559 (2011)

[5] A. A. Savchenkov, A. B. Matsko, V. S. Ilchenko, I. Solomatine, D. Seidel, and L. Maleki, "Tunable Optical Frequency Comb with a Crystalline Whispering Gallery Mode Resonator," Physical Review Letter 101, 093902 (2008)

[6] I. S. Grudinin, N. Yu, and L. Maleki, Optics Letters 34, 878 (2009).

[7] D. Braje, L. Hollberg, and S. Diddams, "Brillouin-enhanced hyperparametric generation of an optical frequency comb in a monolithic highly nonlinear fiber cavity pumped by a cw laser," Phys. Rev. Lett. 102, 193902 (2009)

[8] J. S. Levy, A. Gondarenko, M. A. Foster, A. C. Turner-Foster, A. L. Gaeta, and M. Lipson, "CMOS-compatible multiple-wavelength oscillator for on-chip optical interconnects," Nature Photon. 4, 37-40 (2010)

[9] F. Ferdous, H. Miao, D. E. Leaird, K. Srinivasan, J. Wang, L. Chen, L. T. Varghese and A. M. Weiner, Nature Photonics 5, 770 (2011).

[10] L. Razzari, D. Duchesne, M. Ferrera, R. Morandotti, S. Chu, B. E. Little, and D. J. Moss, "CMOS-compatible integrated optical hyperparametric oscillator," Nature Photon. 4, 41-45 (2010)

[11] S. B. Papp and S. A. Diddams, Phys. Rev. A 84, 053833 (2011).

[12] P. Del'Haye, T. Herr, E. Gavartin, M. L. Gorodetsky, R. Holzwarth, and T. J. Kippenberg, Phys. Rev. Lett. 107, 063901 (2011).

[13] Y. Okawachi, K. Saha, J. S. Levy, Y. H. Wen, M. Lipson, and A. L. Gaeta, Opt. Lett. 36, 3398 (2011).

[14] P. Del'Haye, O. Arcizet, A. Schliesser, R. Holzwarth, and T. J. Kippenberg, Phys. Rev. Lett. 101, 053903 (2008).

[15] J. Li, H. Lee, T. Chen, K. J. Vahala, Froniters in Optics Meeting, Paper # FWB2 (2011).

[16] A. R. Johnson, Y. Okawachi, J. S. Levy, J. Cardenas, K. Saha, M. Lipson, and A. L. Gaeta, Opt. Lett. 37, 875-877 (2012).

[17] H. Lee, T. Chen, J. Li, O. Painter and K. Vahala, Froniters in Optics Meeting, Paper # FWS2 (2011).

[18] H. Lee, T. Chen, J. Li, K. Yang, S. Jeon, O. Painter and K. Vahala, arXiv:1112.2196v1 (2011).

[19] S. M. Spillane, T. J. Kippenberg, O. J. Painter, and K. J. Vahala, Phys. Rev. Lett. 91, 043902 (2003).

[20] M. Cai, O. Painter and K. Vahala, "Observation of critical coupling in a fiber taper to silica-microsphere whispering gallery mode system," Phys. Rev. Lett. 85, 74-77, (2000)

[21] D. K. Armani, T. J. Kippenberg, S. M. Spillane and K. J. Vahala, "Ultra-high-Q toroid microcavity on a chip," Nature, 421, 925-929 (2003)

[22] T. Cannon, L. Yang, and K. J. Vahala, "Dynamical thermal behavior and thermal self-stability of microcavities," Optics Express 12, 4742 (2004)

[23] T. Udem, R. Holzwarth and T. W. Hansch, Nature 416 233, (2002).

[24] F. Quinlan, G. Yeas, S. Osterman, S. A. Diddams, Rev. of Sci. Instr. 81 063105 (2010).

[25] J. Li, H. Lee, T. Chen, O. Painter and K. Vahala, Froniters in Optics Meeting, Paper # FTuD4 (2011).

[26] J. Li, H. Lee, T. Chen, O. Painter and K. Vahala, arXiv: 1201.4212 (2012).

[27] P. Del'Haye, O. Arcizet, M. L. Gorodetsky, R. Holzwarth, and T. J. Kippenberg, Nature Photonics 3, 529 (2009).

[28] M. A. Foster, J. S. Levy, O. Kuzucu, K. Saha, M. Lipson, and A. L. Gaeta, Opt. Express 19, 14233 (2011).

[29] I. S. Grudinin, N. Yu, and L. Maleki, "Generation of optical frequency combs with a $CaF_2$ resonator," Opt. Lett. 45, 878-880 (2009).

[30] S. M. Spillane, T. J. Kippenberg, O. J. Painter, and K. J. Vahala, "Ideality in a Fiber-Taper-Coupled Microresonator System for Application to Cavity Quantum Electrodynamics," Phys. Rev. Lett. 85, 043902, (2003)

What is claimed is:

1. A chip-based frequency comb generator comprising: a chip-based disk resonator comprising a waveguide that is a part of a wedge structure fabricated from a silicon dioxide layer, the disk resonator having a low threshold microwave to millimeter wave repetition rate control, with repetition rates ranging from 2.6 GHz for a disk resonator having a diameter of 25 mm to 220 GHz for a disk resonator having a diameter of 0.3 mm.

2. The frequency comb generator of claim 1, wherein the repetition rates include 4.4 GHz for a disk resonator having a diameter of 15 mm, 6.8 GHz for a disk resonator having a diameter of 9 mm, 8.8 GHz for a disk resonator having a diameter of 7 mm, 16.4 GHz for a disk resonator having a diameter of 4 mm, 22 GHz for a disk resonator having a diameter of 2.5 mm, 33 GHz for a disk resonator having a diameter of 1.5 mm, 51 GHz for a disk resonator having a diameter of 1 mm and 66 GHz for a disk resonator having a diameter of 0.9 mm.

3. The frequency comb generator of claim 1, wherein the disk resonator is configured to generate a frequency comb comprising about 1900 comb lines.

4. The frequency comb generator of claim 3, wherein the frequency comb is generated when the disk resonator is provided a pump power at about 200 mW.

5. The frequency comb generator of claim 3, wherein the disk resonator has a diameter of about 2 mm and generates the frequency comb with a repetition rate of about 33 GHz and a span ranging from about 1320 nm to about 1820 nm.

6. The frequency comb generator of claim 1, wherein the wedge structure is fabricated in part by eliminating a foot region in a silicon dioxide layer of an integrated circuit, and having a linear sloping surface with a linear slope angle ranging from >7 degrees to ≤90 degrees, the linear sloping surface further characterized by an absence of the foot region.

* * * * *